United States Patent [19]
Greywall

[11] Patent Number: 5,786,927
[45] Date of Patent: Jul. 28, 1998

[54] GAS-DAMPED MICROMECHANICAL STRUCTURE

[75] Inventor: Dennis S. Greywall, White House Station, N.J.

[73] Assignee: Lucent Technologies Inc., Murray Hill, N.J.

[21] Appl. No.: 815,774

[22] Filed: Mar. 12, 1997

[51] Int. Cl.⁶ .................................................. G02B 26/00
[52] U.S. Cl. ............................................................ 359/291
[58] Field of Search .................................. 359/290, 291

[56] References Cited

U.S. PATENT DOCUMENTS 5,280,173  1/1994  Morse et al. ...................... 250/227.23

Primary Examiner—Georgia Y. Epps
Assistant Examiner—Dawn-Marie Bey

[57] ABSTRACT

An improved squeeze-type micromechanical structure for high speed operation, i.e., greater than 1 MHz, is disclosed. The structure has a movable member possessing damping holes. The porosity, $1/(\omega_o \tau)$, of the movable member is at least about 1.4. The structure is hermetically sealed and is maintained above atmospheric pressure and at a minimum reduced pressure or gas frequency, $\omega_g/\omega_o$, of about 1.3. To operate with less than 10 percent "ringing," $\omega_g/\omega_o > 1.3$ and $0.25+0.7(\omega_g/\omega_o)^2 - 0.8(\omega_g/\omega_o - 1.25) \leq 1/(\omega_o \tau) \leq 0.25+0.7(\omega_g/\omega_o)^2 + (\omega_g/\omega_o - 1.25)$.

18 Claims, 39 Drawing Sheets

FIG. 11A
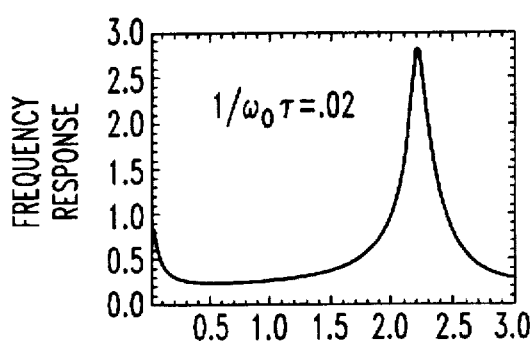
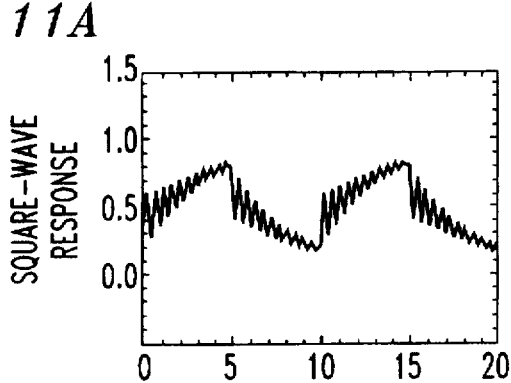
FIG. 11B
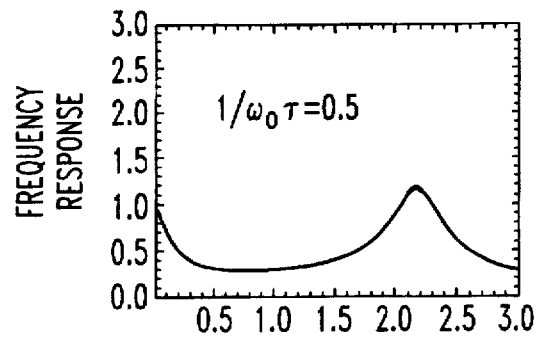
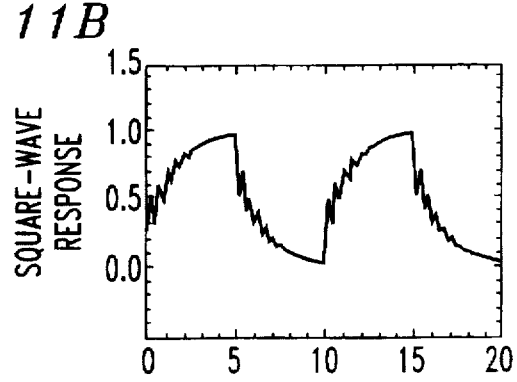
FIG. 11C
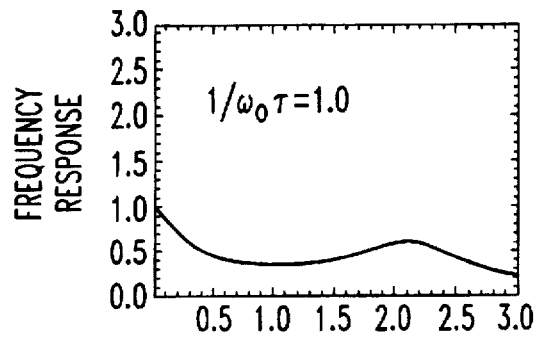
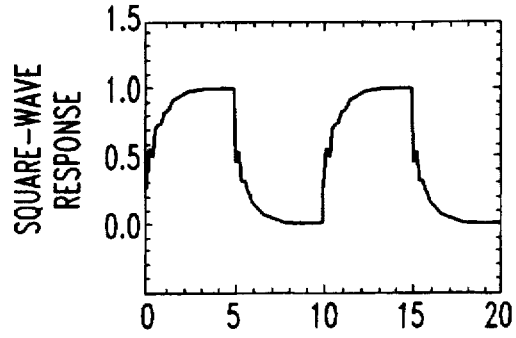
FIG. 11D
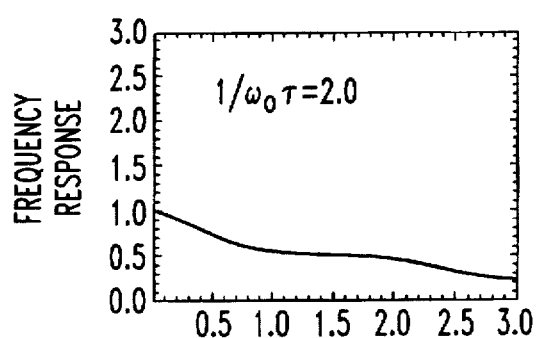
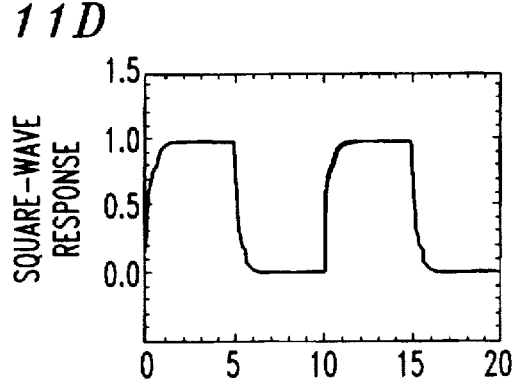

SQUARE-WAVE RESPONSE

SQUARE-WAVE RESPONSE

SQUARE-WAVE RESPONSE

SQUARE-WAVE RESPONSE

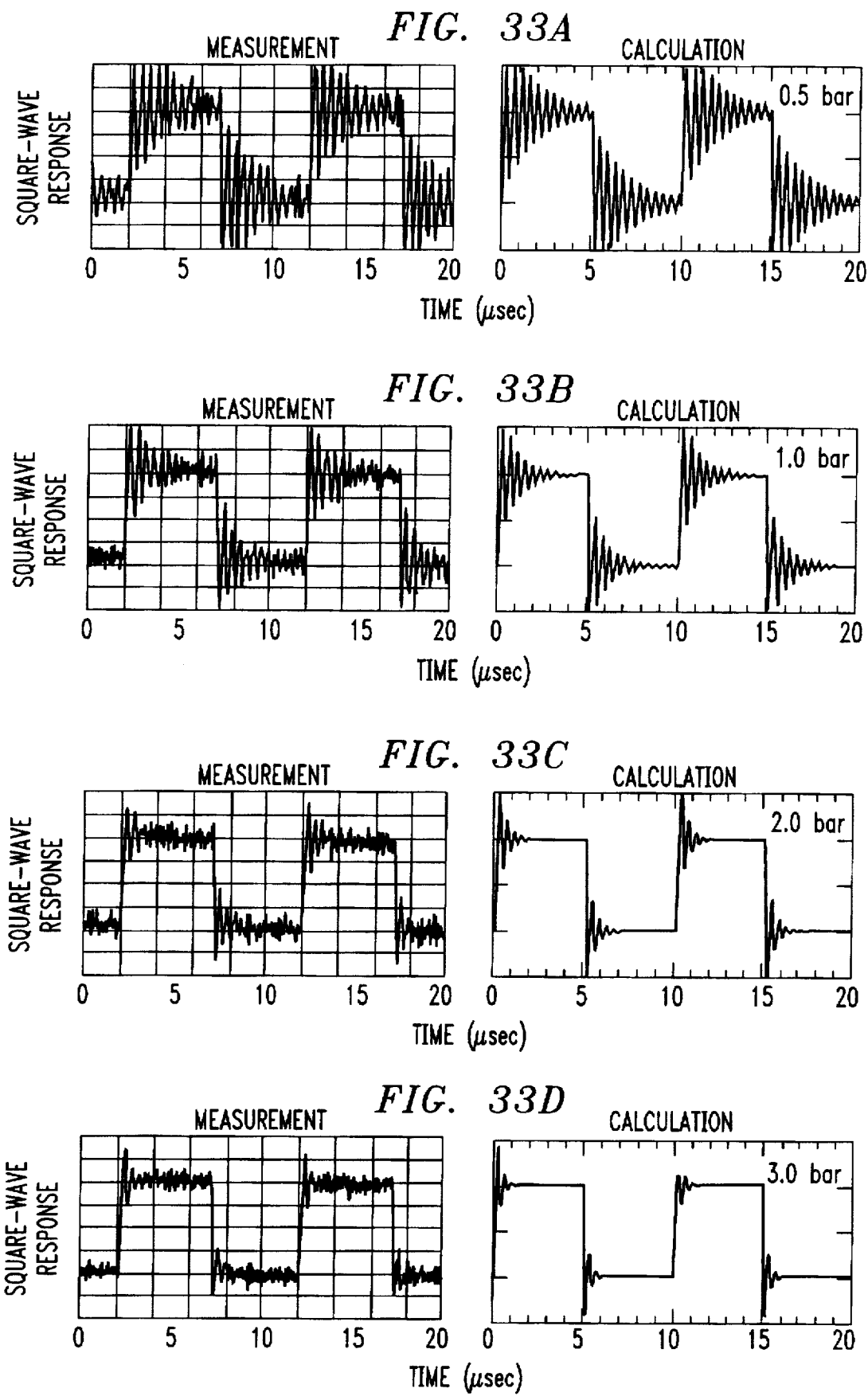

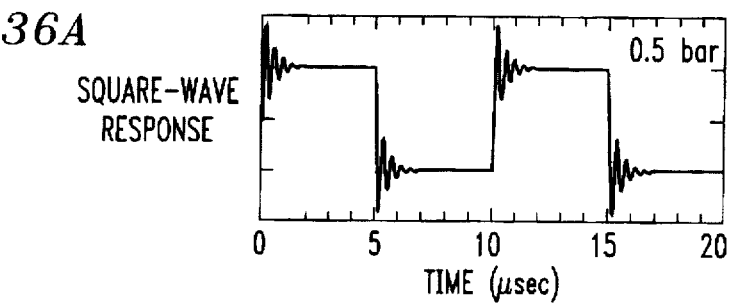
FIG. 36A SQUARE-WAVE RESPONSE 0.5 bar
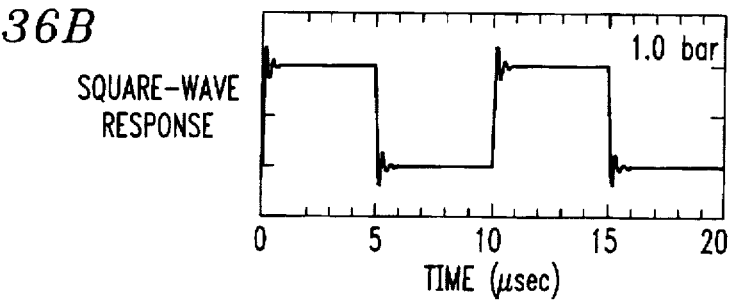
FIG. 36B SQUARE-WAVE RESPONSE 1.0 bar
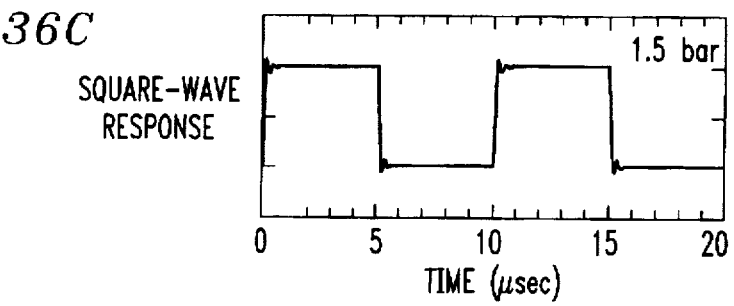
FIG. 36C SQUARE-WAVE RESPONSE 1.5 bar
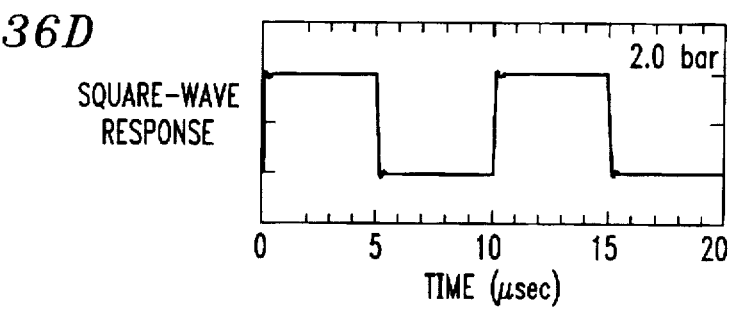
FIG. 36D SQUARE-WAVE RESPONSE 2.0 bar
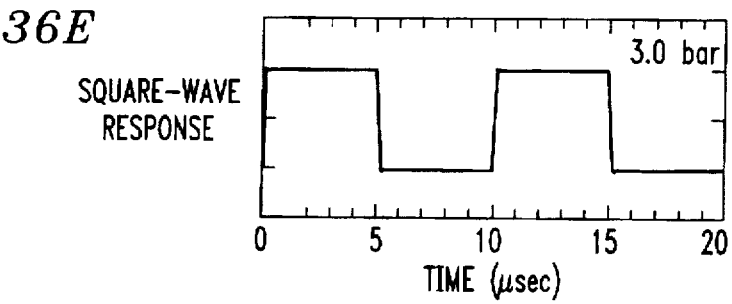
FIG. 36E SQUARE-WAVE RESPONSE 3.0 bar

SQUARE-WAVE RESPONSE

SQUARE-WAVE RESPONSE

SQUARE-WAVE RESPONSE

SQUARE-WAVE RESPONSE

SQUARE-WAVE RESPONSE

GAS-DAMPED MICROMECHANICAL STRUCTURE

FIELD OF THE INVENTION

The present invention relates generally to the damping of high speed micromechanical structures to minimize ringing.

BACKGROUND OF THE INVENTION

Micromechanical optical modulators may be used to encode data onto an optical signal for transmission through an optical communications network. Typically, such modulators have a variable gap defined by two layers of material, one of which layers is vertically-movable. The change in the vertical position of the membrane relative to the substrate, and the concomitant change in the size of the gap, alters the optical properties of the modulator. Such a change in optical properties can be used to modulate an optical signal.

For some applications, such as Ether Net and high-definition television, optical modulators will be required to operate at 10 Megabits per second or more. Most conventional micromechanical modulators are typically limited, however, to data (bit) rates of about 2 Megabits per second.

The aforementioned data rate limitation arises for several reasons. One reason pertains to the substantial increase in drive voltage required to obtain such higher speeds. See U.S. Pat. No. 5,646,772 (Ser. No. 08/644,350). A second reason pertains to ringing or vibration that can occur in the movable layer. At operating rates below about 1 MHz (about 2 Megabits per second), the gas within the modulator cavity, usually air, is able to sufficiently damp the movable layer. More particularly, the shear flow that is generated in the air as the layer moves dissipates the layer's kinetic energy. At operating frequencies above about 1 MHz, however, this dissipation mechanism becomes ineffective because the air does not have sufficient time to flow. Rather, the air is compressed as the layer moves downwardly, storing energy like a spring.

As such, there is a need for a micromechanical optical modulator capable of attaining high operating speeds.

SUMMARY OF THE INVENTION

The present inventor has discovered that to achieve a clean square wave response in "squeeze-type" micromechanical structures operating at frequencies above about 1 MHz, two thresholds must be met. First, such structures must be pressurized to greater than atmospheric pressure. Second, a movable member possessing holes for gas flow that characterizes such devices must have a minimum porosity, achieved by providing a sufficient number of holes.

Improved squeeze-type micromechanical structures according to the invention operate above atmospheric pressure. Further, in preferred embodiments, such structures have a minimum porosity, $1/(\omega_o \tau)$, of about 1.4 and more preferably 1.8, and a minimum reduced pressure or gas frequency, $\omega_g/\omega_o$, of about 1.3 and more preferably 1.5. To achieve high speed devices with less than 10 percent "ringing" requires that $\omega_g/\omega_o > 1.25$ and $0.25+0.7(\omega_g/\omega_o)^2-0.8(\omega_g/\omega_o-1.25) \leq 1/(\omega_o \tau) \leq 0.25+0.7(\omega_g/\omega_o)^2+(\omega_g/\omega_o-1.25)$.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIGS. 11a–h show plots of the square wave response corresponding to a given frequency response for a reduced gas frequency of 2 and varying piston porosity;

3

Figure 22:
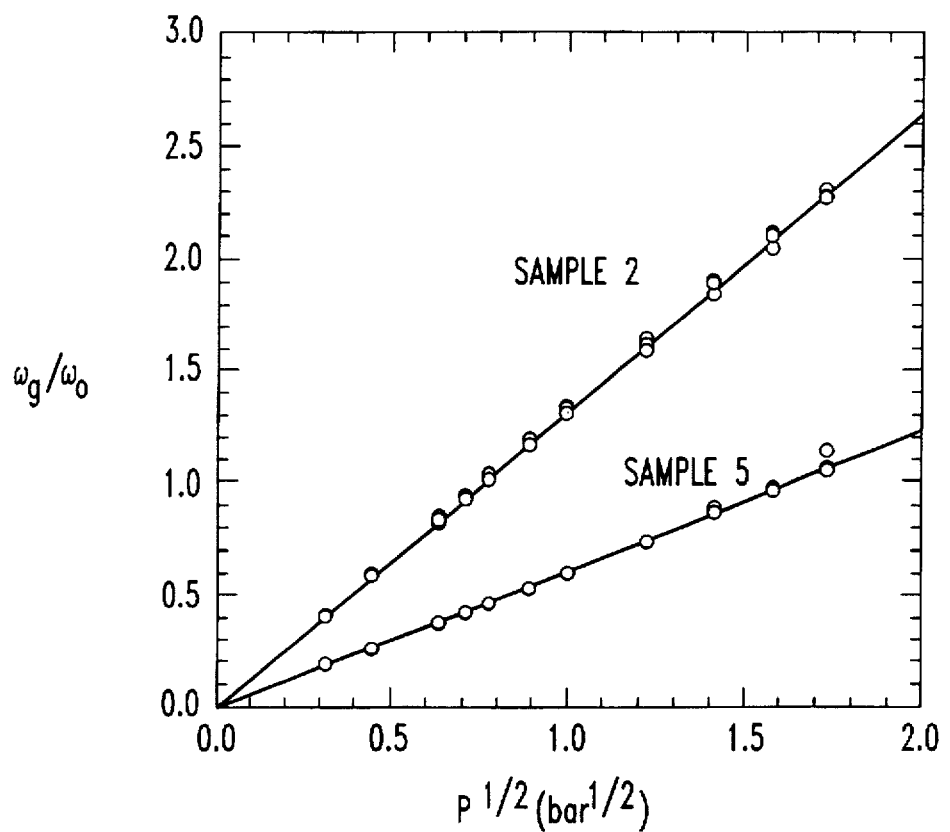
Figure 23:
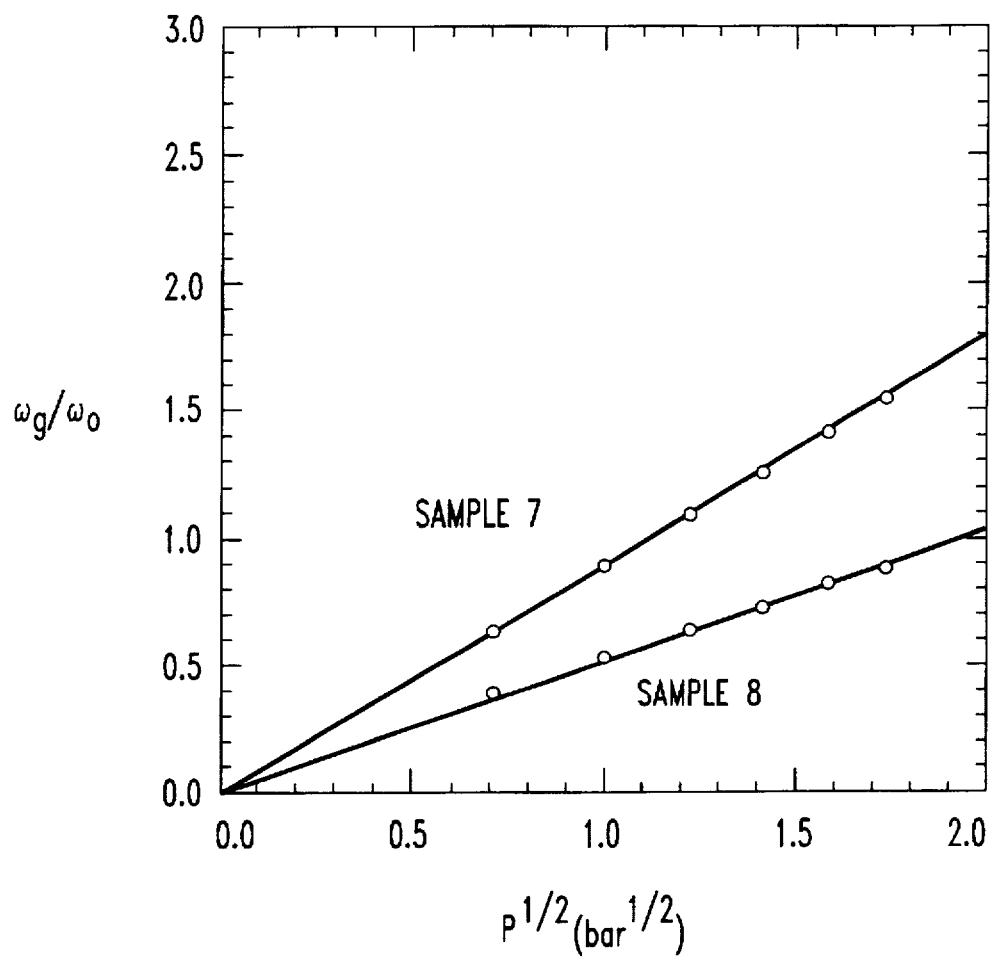
Figure 24A:
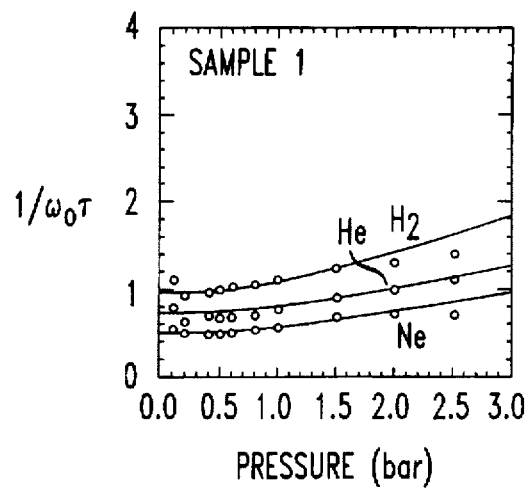
Figure 24B:
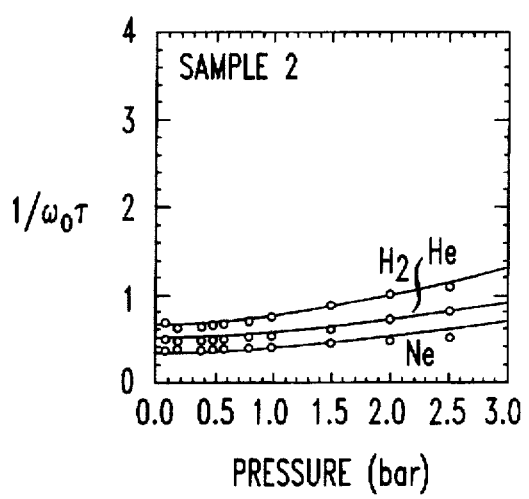
Figure 24C:
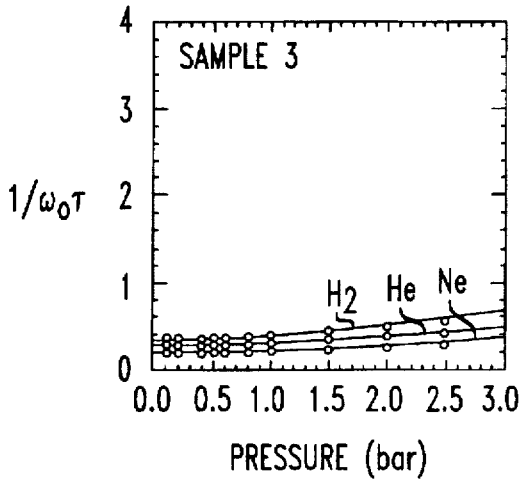
Figure 24D:
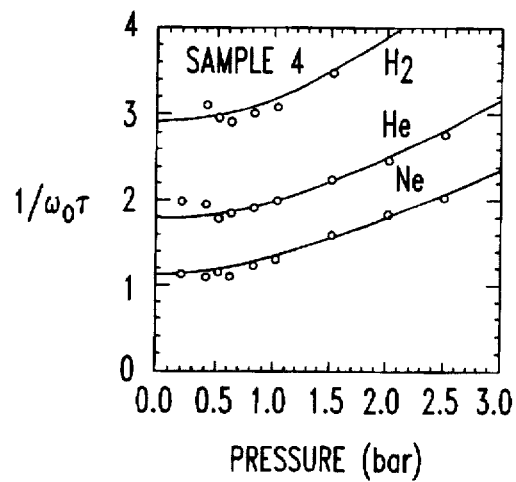
Figure 24E:
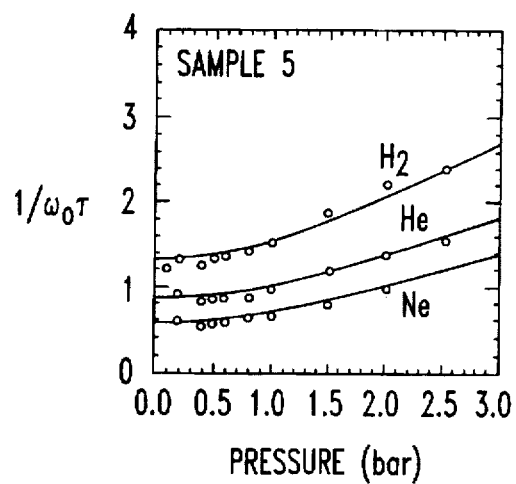
Figure 24F:
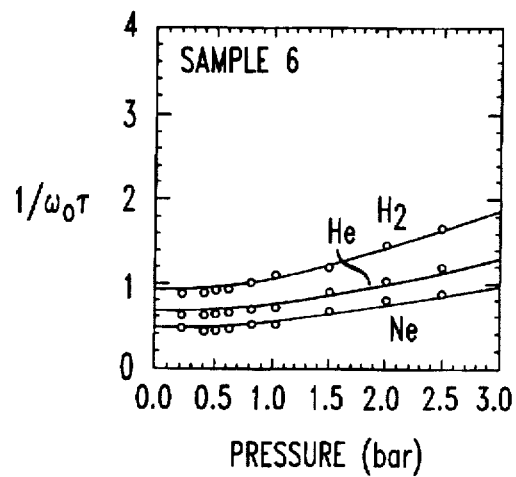
Figure 25:
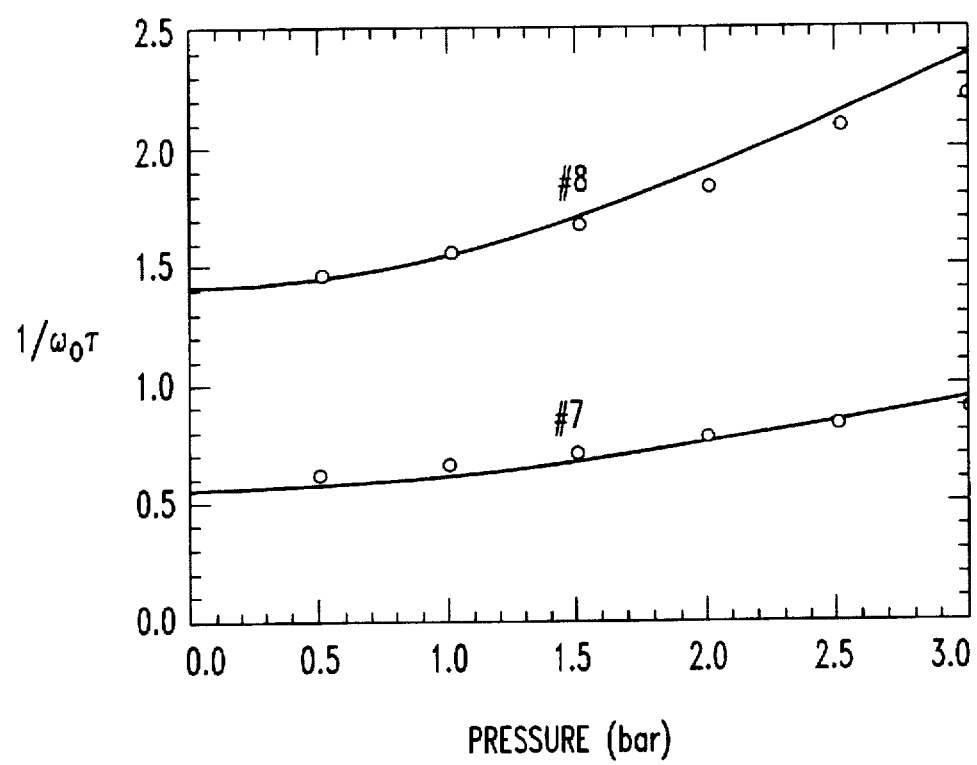
Figure 26:
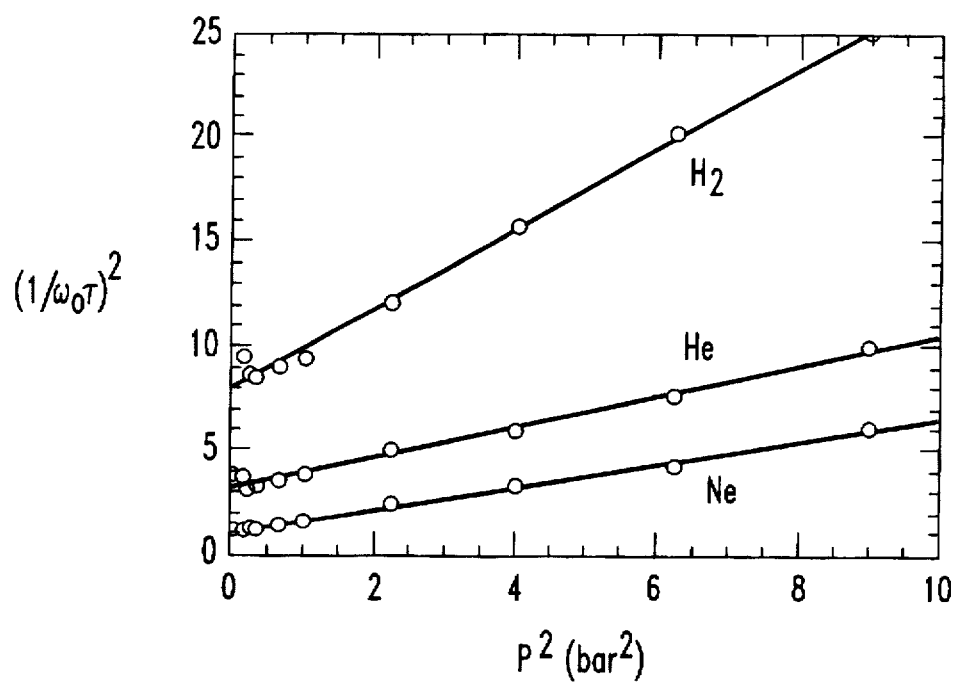
Figure 27:
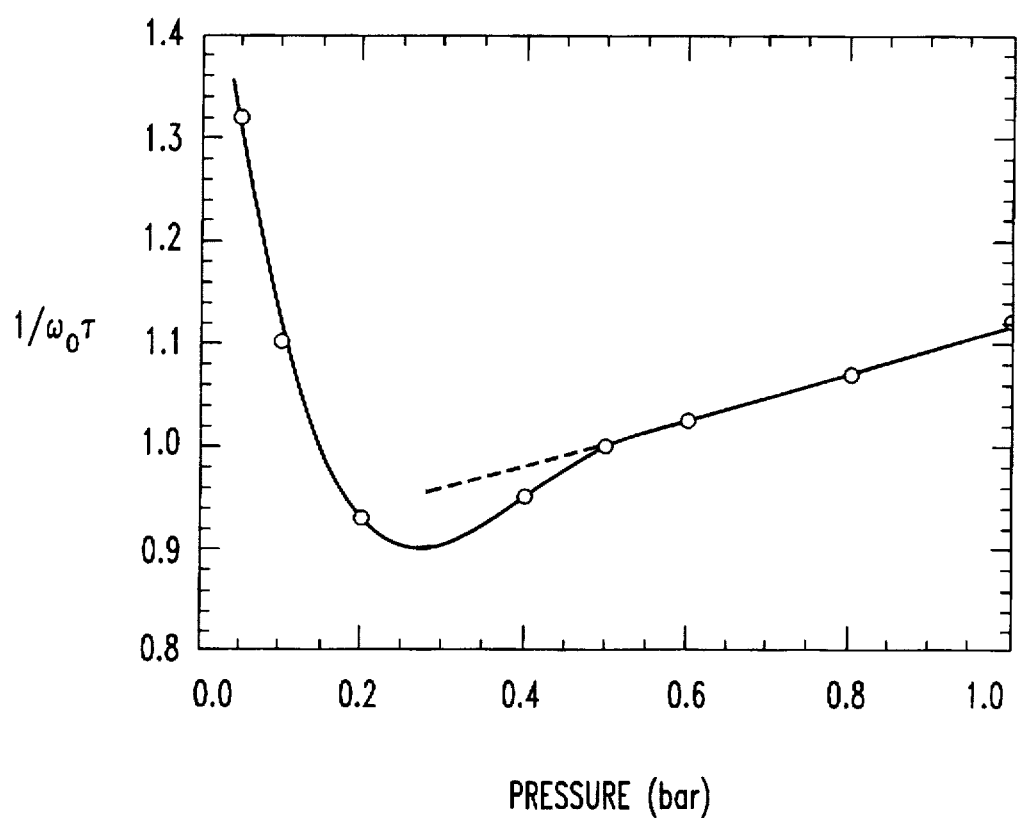
Figure 28:
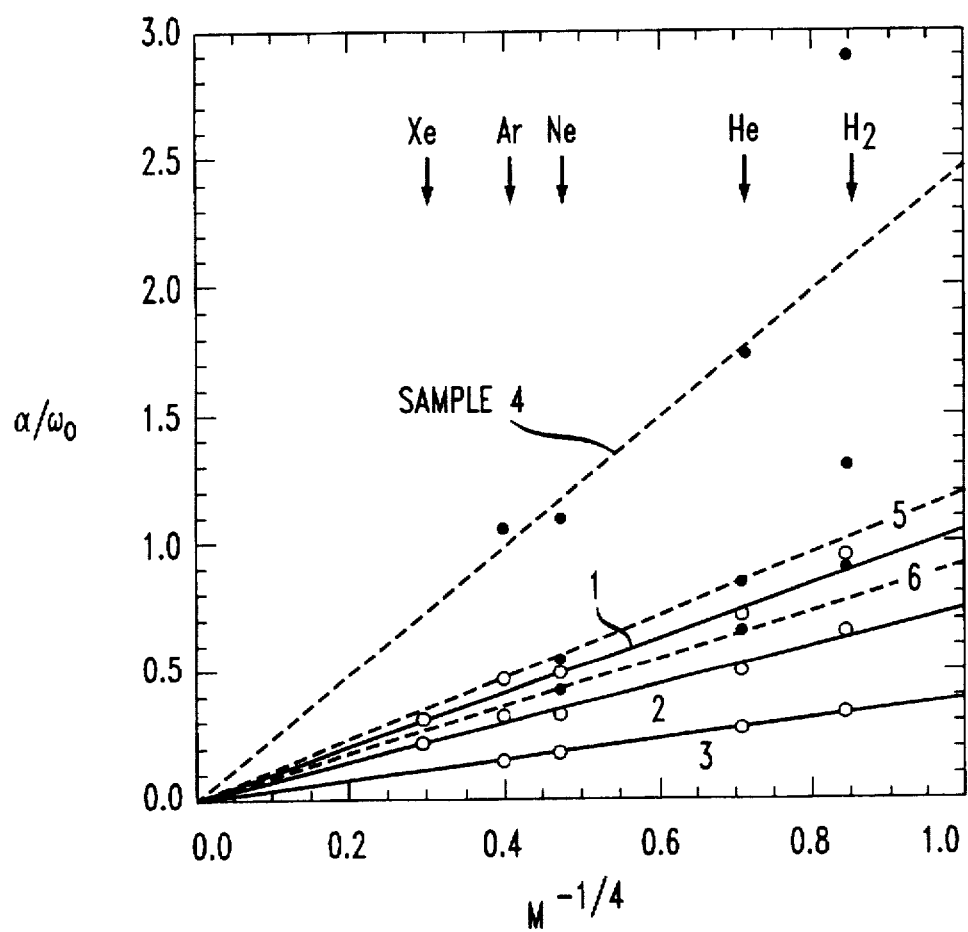
Figure 29A:
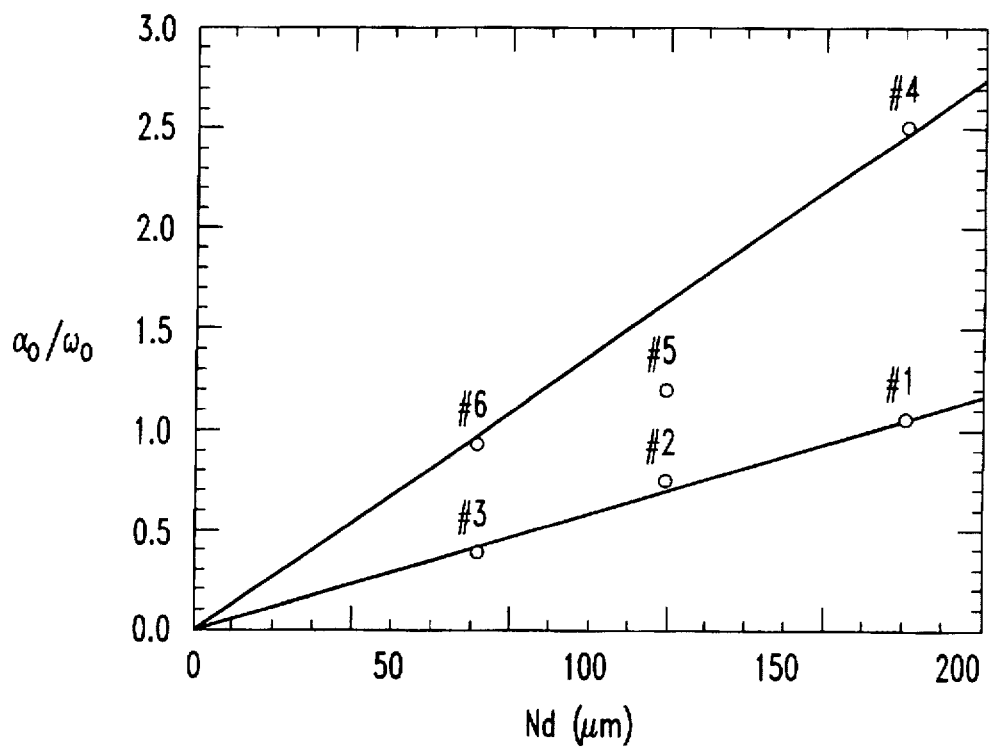
Figure 29B:
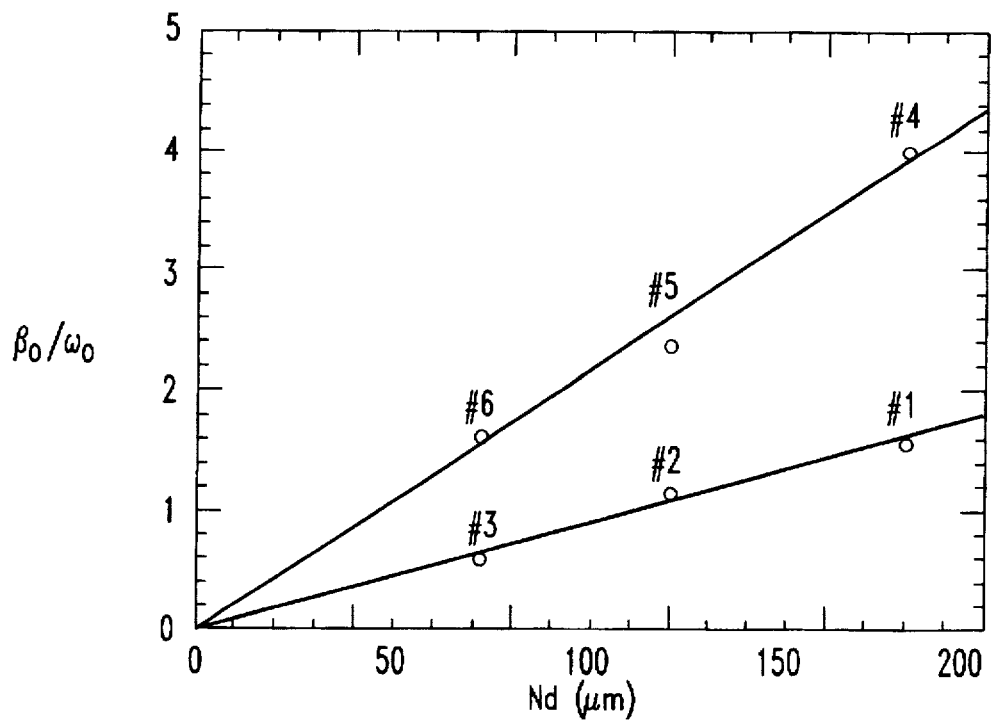
Figure 30:
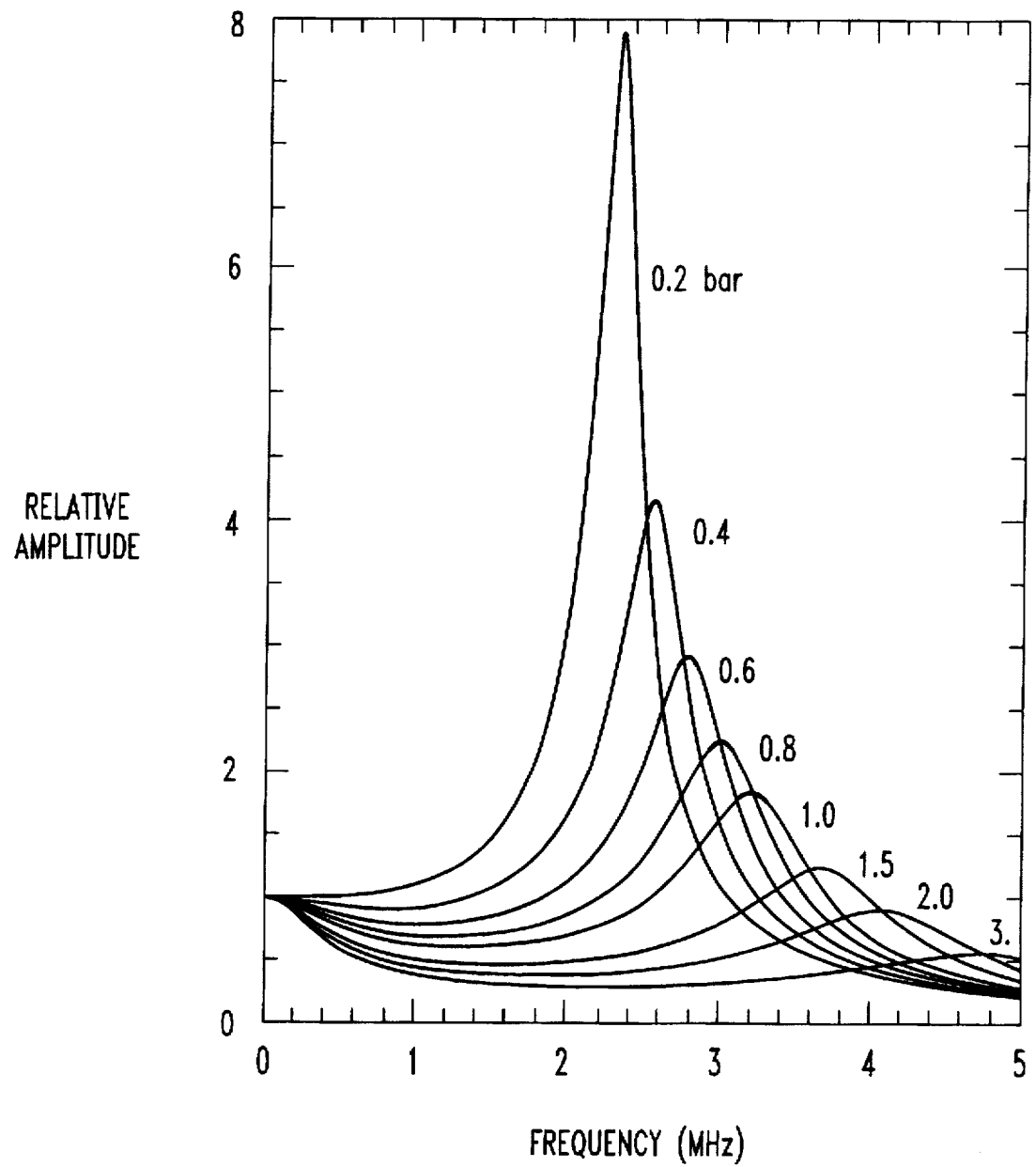
Figure 31:
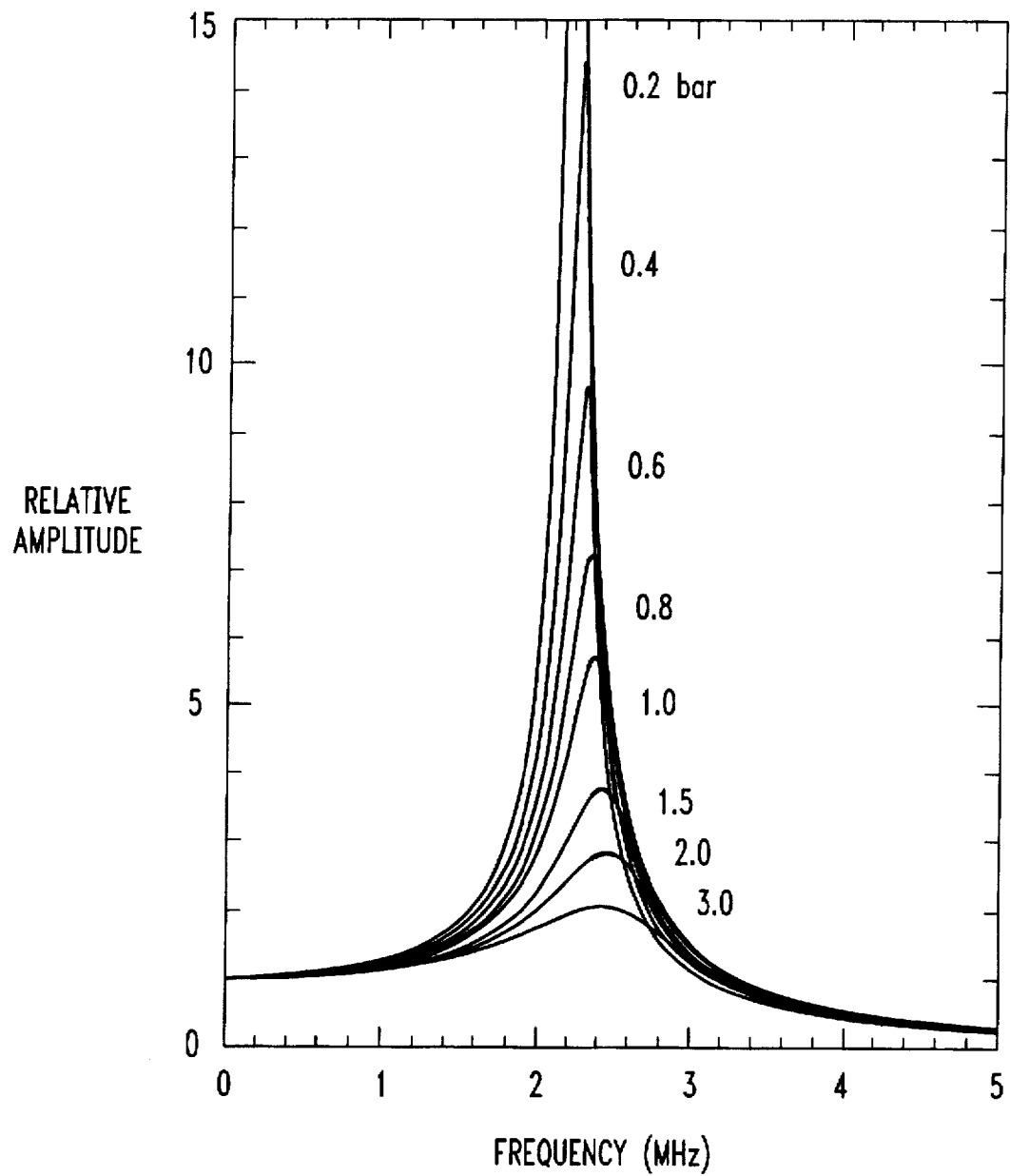
Figure 32A:
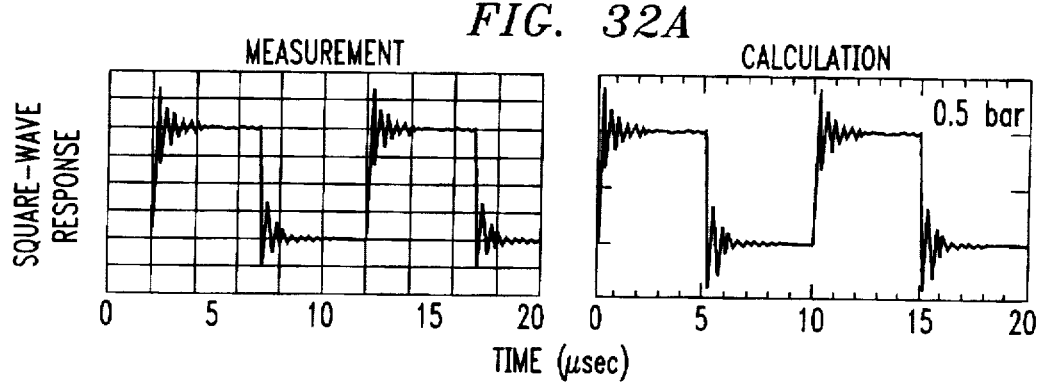
Figure 32B:
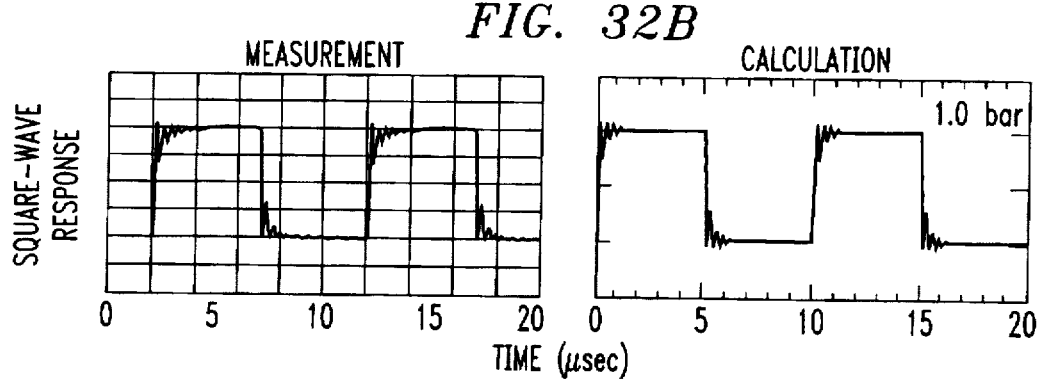
Figure 32C:
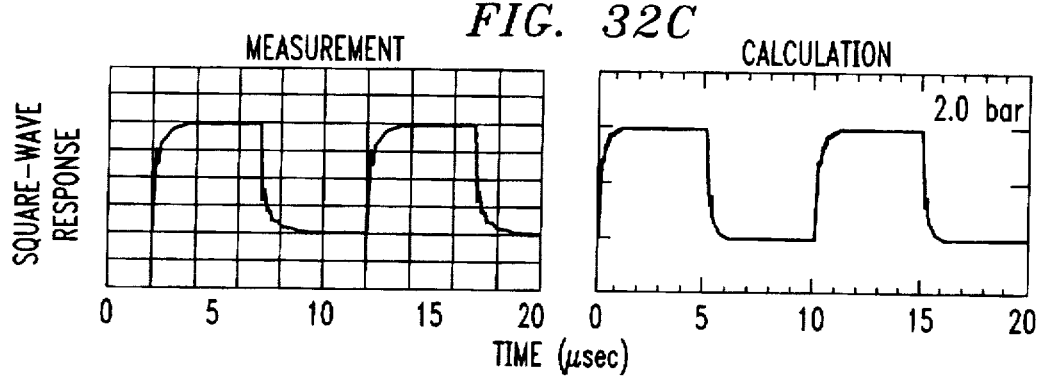
Figure 32D:
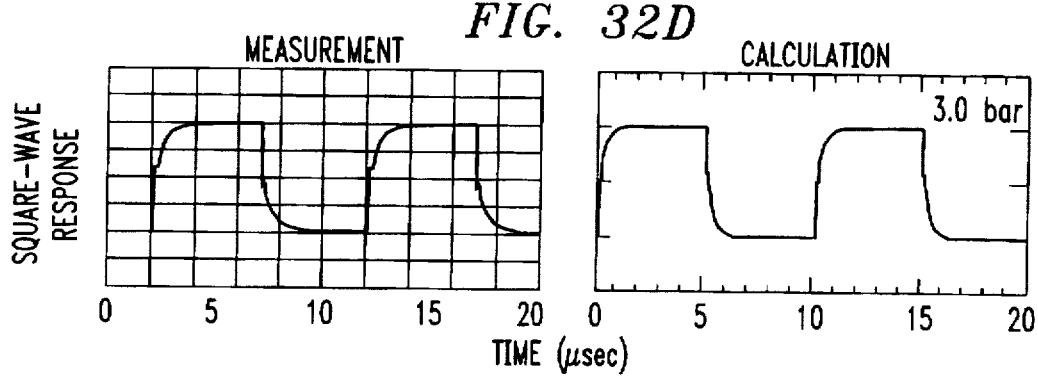
Figure 34:
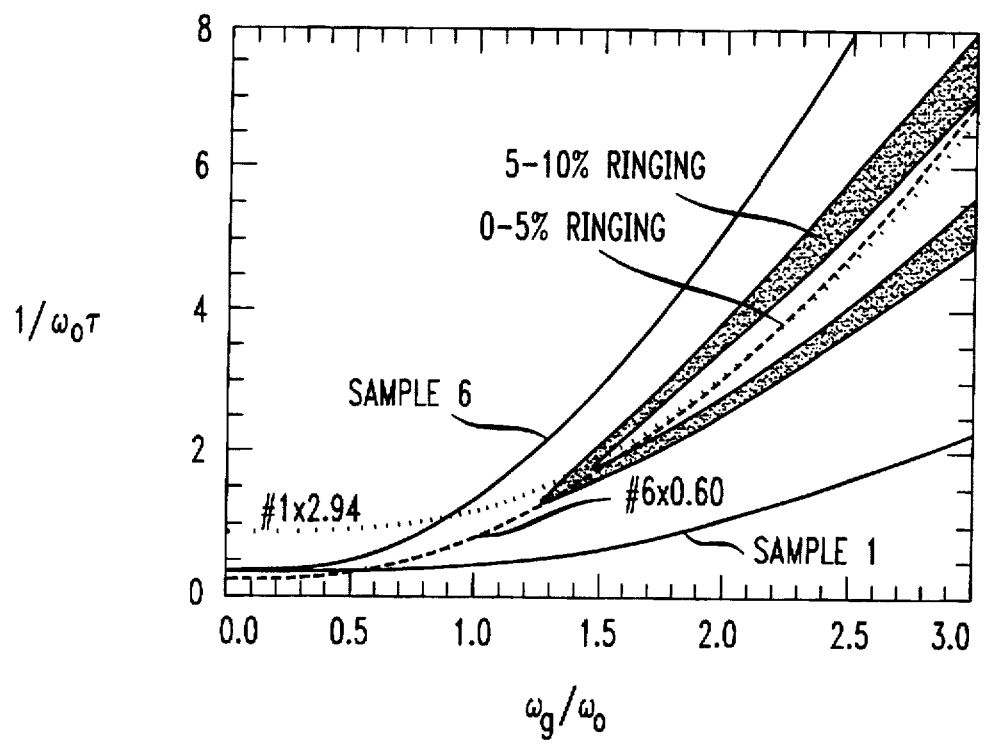
Figure 35:
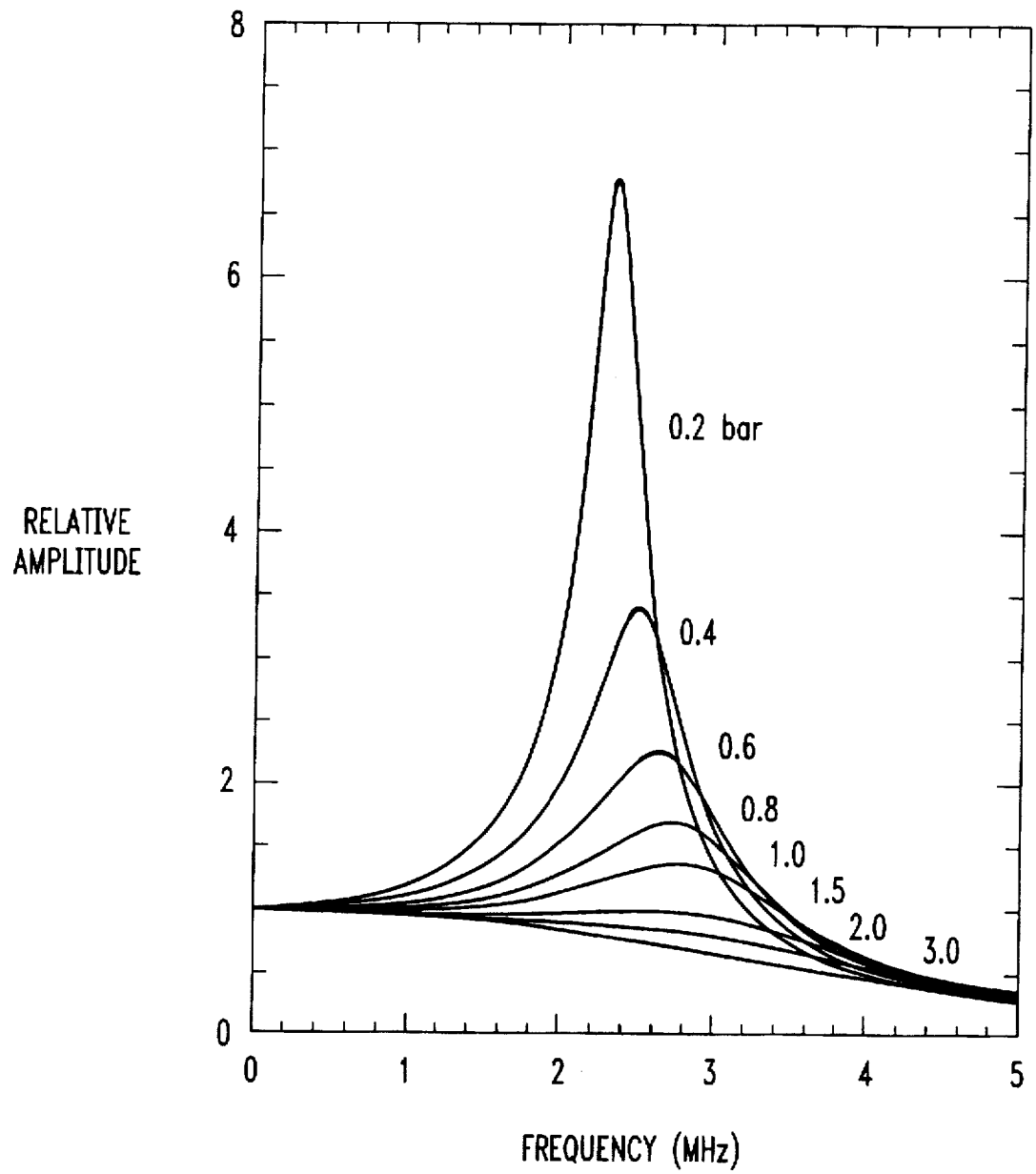
Figure 37A:
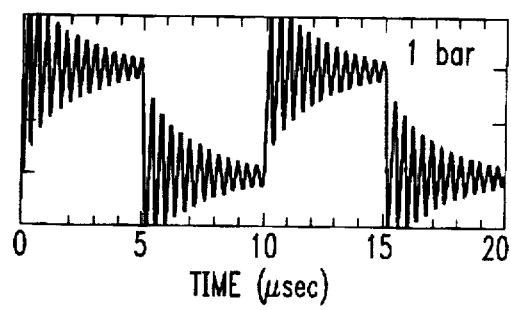
Figure 37B:
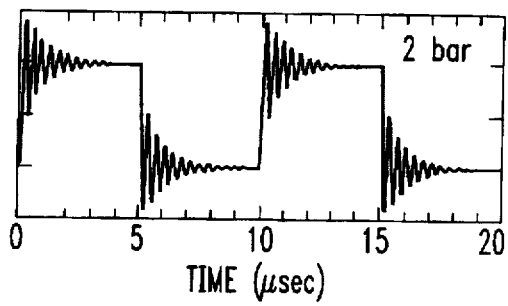
Figure 37C:
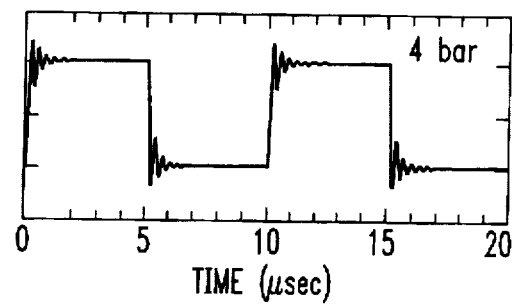
Figure 37D:
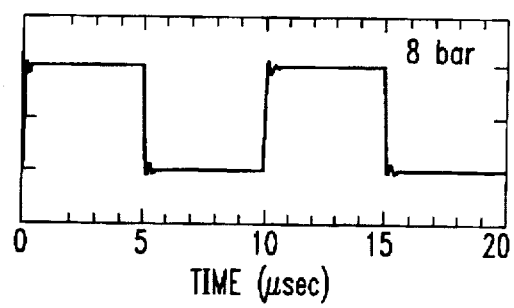
Figure 37E:
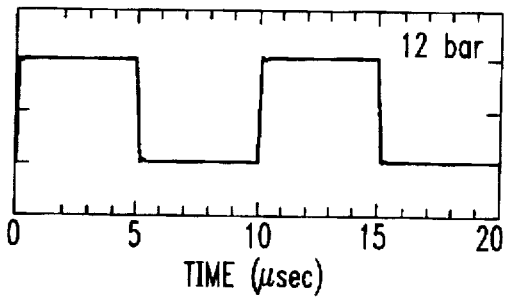
Figure 38:
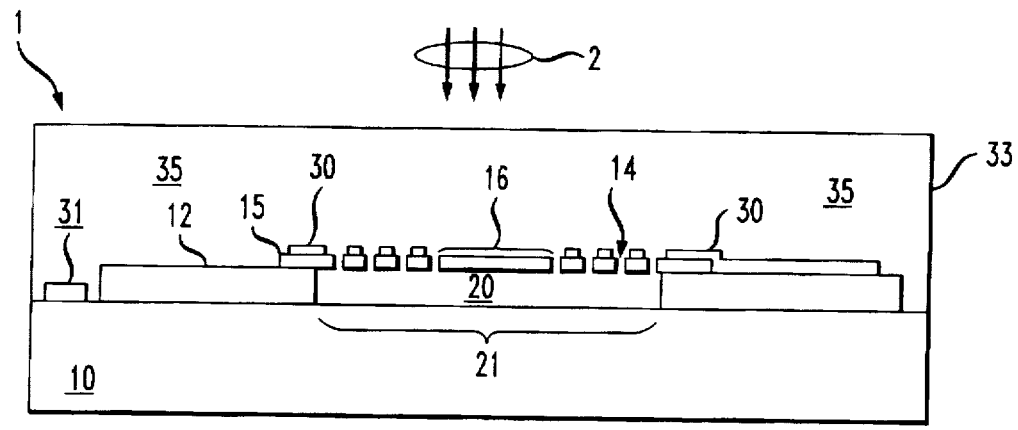

FIG. 22 is a plot of reduced gas frequency versus pressure to the one-half power for exemplary drumhead modulator nos. 2 and 5;

FIG. 23 is a plot of reduced gas frequency versus pressure to the one-half power for exemplary drumhead modulator nos. 7 and 8;

FIGS. 24a–f are plots of membrane porosity as a function of pressure for exemplary drumhead modulators 1–6, respectively, under hydrogen, helium and neon atmospheres;

FIG. 25 is a plot of membrane porosity as a function of pressure for exemplary modulators 7 and 8 under helium pressure;

FIG. 26 is a plot of membrane porosity squared versus pressure squared for exemplary drumhead modulator no. 4 under hydrogen, helium and neon atmospheres;

FIG. 27 is a plot of porosity versus pressure for exemplary drumhead modulator no. 1 under hydrogen atmosphere;

FIG. 28 is a plot illustrating the proportionality between a and molecular weight for rare earth gases for exemplary drumhead modulators nos. 1–6;

FIG. 29a is a plot of $\alpha$ as a functon of the total circumference of all membrane damping holes for exemplary drumhead modulators nos. 1–6;

FIG. 29b is a plot of $\beta$ as a functon of the total circumference of all membrane damping holes for exemplary drumhead modulators nos. 1–6;

FIG. 30 shows calculated resonance curves at a variety of pressure for exemplary drumhead modulator no. 2;

FIG. 31 shows calculated resonance curves at a variety of pressure for exemplary drumhead modulator no. 5;

FIGS. 32a–d show a comparison of measured and calculated square wave response for exemplary drumhead modulator no. 1 under a hydrogen atmosphere and a variety of pressures;

FIGS. 33a–d show a comparison of measured and calculated square wave response for exemplary drumhead modulator no. 5 under a helium atmosphere and a variety of pressures;

FIG. 34 is a plot of membrane porosity versus reduced gas frequency for exemplary drumhead modulators nos. 1 and 6;

FIG. 35 is a plot of a calculated response curve for exemplary drumhead modulator no. 1 under an argon atmosphere at a variety of pressures;

FIGS. 36a–e show a calculated square-wave response for an exemplary drumhead modulator having a small gap and an optimum damping hole arrangement at a variety of pressures;

FIGS. 37a–e show a calculated square-wave response for an exemplary drumhead modulator having a large gap and an optimum damping hole arrangement at a variety of pressures;

FIG. 38 is a cross-sectional view of an exemplary drumhead modulator; and

Figure 39:
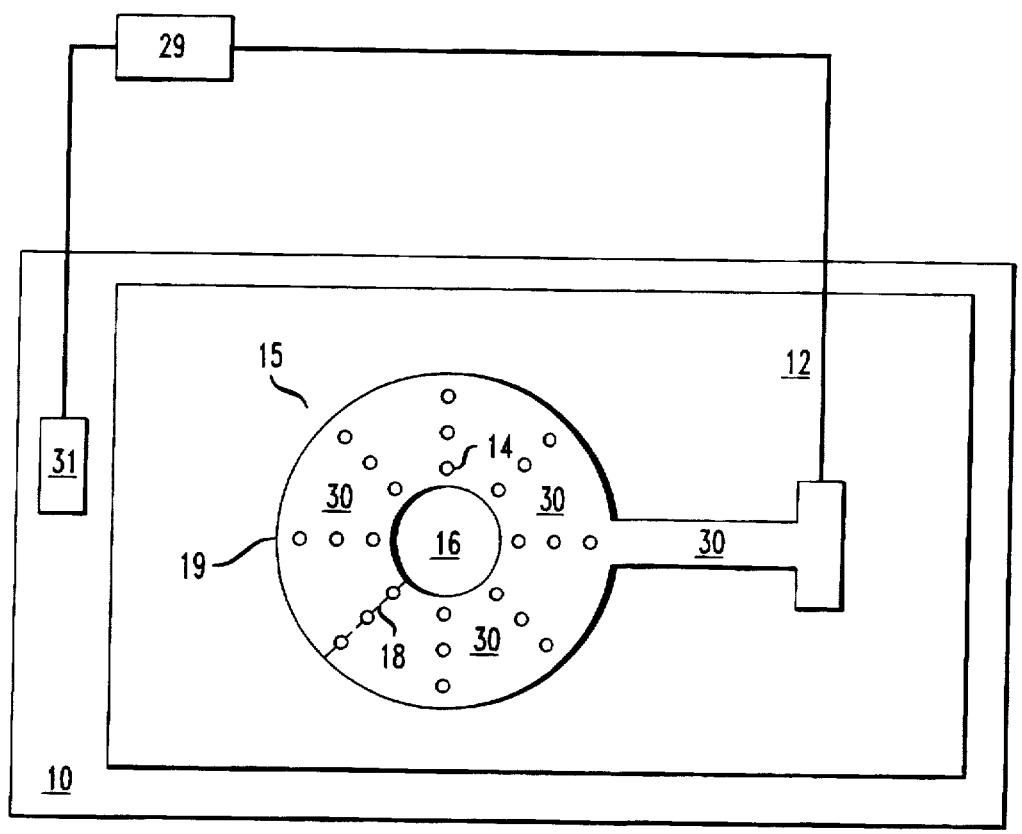

FIG. 39 is a plan view of an exemplary drumhead modulator.

DETAILED DESCRIPTION

The present invention is applicable to "squeeze-type" micromechanical structures wherein a volume of gas is compressed as a movable member of such a structure moves. One example of a squeeze-type micromechanical structure is a drum-head micromechanical modulator possessing damping holes as described in U.S. patent application Ser. No. 08/565,453. Illustrative embodiments presented herein are directed to such drum-head micromechanical optical modulators. It should be understood, however, that the present invention applies to other squeeze-type structures as well. Application Ser. No. 08/565,453, and all other patents, patent applications and other publications mentioned in this specification are incorporated by reference herein.

The theory and modeling underlying the present invention is presented in Section II, subsections 1–10 of this specification. The application of the model to illustrative embodiments is described in Section I and Section II, subsections 11 and 12.

Section I

An exemplary drum-head micromechanical modulator having damping holes is illustrated in FIGS. 38 and 39. The modulator has a membrane 15 that is suspended, via a layer 12, over a substrate 10, defining a gap 20 therebetween. The membrane 15 forms a continous surface that overlaps, at every point, the perimeter 19 of modulator cavity 21 defined in the layer 12. A plurality of holes 14 are arranged in a preferably regular pattern across the membrane 15.

In the exemplary drum-head modulator shown in FIGS. 38 and 39, the holes 14 are located beginning outside of a centrally located region 16 that forms an "optical window." The optical window 16 is typically in optical communication with an optical waveguide or fiber, not shown, that delivers an optical signal 2 to the modulator. In other embodiments, holes 14 can be located within the optical window 16, although their presence in that region of the membrane 15 may affect the optical properties of the modulator. In still other embodiments, the modulator, or, more generally, other squeeze-type micromechanical structures, can be configured so that the damping holes 14 are located in another part of the structure, such as in the layer 12, and allow gas to move out of the region beneath the membrane or movable member 15, i.e., the modulator cavity, to provide damping.

The modulator is enclosed within a hermetic seal 33 using known techniques. The hermetically sealed modulator is under a gas atmosphere, preferably hydrogen or a noble gas, i.e., helium, neon, and the like. Pressure in the region 35 above the membrane is referred to as the ambient pressure of the modulator or the membrane.

The membrane 15 must be conductive, or, alternatively as shown in FIGS. 38 and 39, have a layer 30 of conductive material disposed thereon. The membrane 15 and substrate 10 are in electrical contact with controlled voltage source 29. A contact 31 may be deposited on the substrate 10 to facilitate wire bonding to the controlled voltage source.

In operation, the membrane 15 moves between a quiescent or equilibrium position under the action of the controlled voltage source 29. Movement of the membrane 15 changes the size of the gap 20, which changes the reflectivity of the modulator.

As described in detail in Section II of this specification, it has been discovered that to satisfactorily damp vibrations associated with a rapidly oscillating member of a squeeze-type micromechanical structure, such as the membrane of the aforedescribed modulator, a minimum porosity, i.e., the number of holes in the member, and a minimum ambient gas pressure, is required. This discovery is described briefly below and illustrated in FIG. 14.

Figure 14:
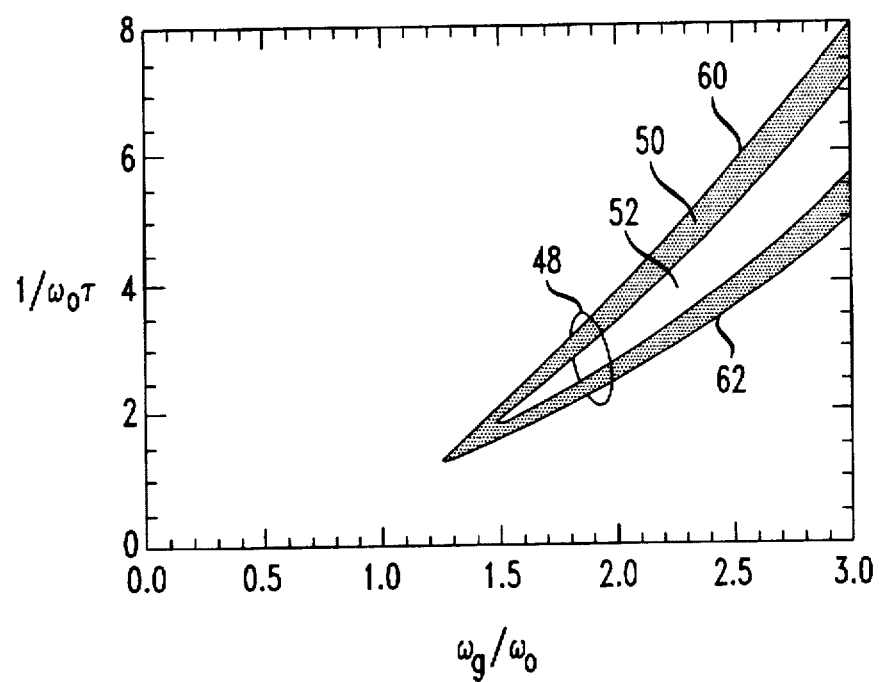
FIG. 14 is a plot of reduced gas frequency versus piston porosity showing a region for near optimum square wave response.
Figure 15A:
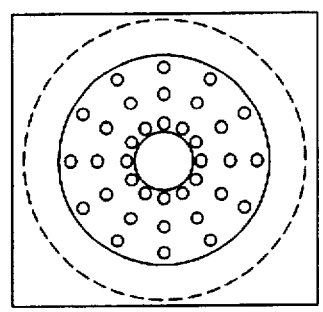
FIGS. 15a–d show top view schematics of exemplary damping hole patterns in drumhead membranes.
Figure 15B:
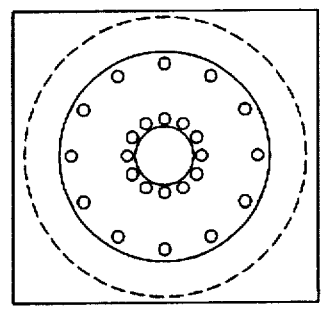
Figure 15C:
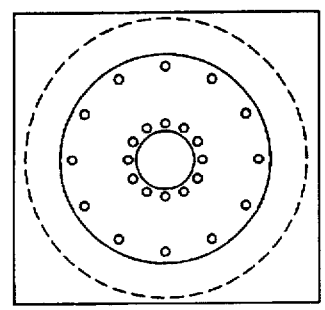
Figure 15D:
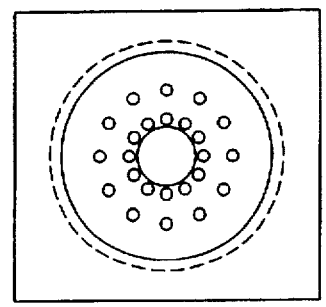

FIG. 14 is a plot of $1/(\omega_o \tau)$ versus $\omega_g/\omega_o$. The parameter $1/\tau$ is a measure of the membrane's porosity. See Section II.2. The parameter $\omega_g$, referred to as the gas frequency, is a measure of the contribution to the resonant frequency of the membrane that is associated with the compression of the gas. As can be seen from Eq. (17) in Section II.2, $\omega_g$ is proportional to the square root of the ambient pressure, $P_o$, and can thus be used as a measure of pressure. The parameter $\omega_o$ is the natural (vacuum) resonant frequency of the membrane. See Section II.2. The parameter $\omega_o$ is used to express the membrane parameters in reduced (dimensionless) quantities.

With continuing reference to FIG. 14, region 48 defines an operating regime in which membrane ringing will be limited to 10 percent or less, which can be acceptable depending upon application specifics. More particularly, region 50 defines an operating regime having 5 to 10 percent ringing, and region 52 defines an operating regime having from 0 to 5 percent ringing. FIG. 14 indicates that there are threshold values for $1/(\omega_o\tau)$ and $\omega_g/\omega_o$ that must be met to avoid membrane ringing. The parameter $1/(\omega_o\tau)$ must be greater than about 1.4 and is preferably greater than about 1.8, and the parameter $\omega_g/\omega_o$ must be greater than about 1.3 and is preferably greater than about 1.5. One previously unknown implication of this result is that a minimum pressure must be exceeded to achieve a clean square wave response, i.e., minimal ringing, independent of the number of damping holes. The uppermost boundary 60 of region 50 can be described by an empirically determined expression: $1/(\omega_o\tau) = 0.25+0.7(\omega_g/\omega_o)^2+(\omega_g/\omega_o-1.25)$, for $\omega_g/\omega_o > 1.3$. Similarly, the lower most boundary 62 of region 50 can be described by: $1/(\omega_o\tau)=0.25+0.7(\omega_g/\omega_o)_2-0.8(\omega_g/\omega_o-1.25)$, for $\omega_g/\omega_o > 1.3$. Thus, in a preferred embodiment of the present invention, the reduced gas frequency of a drum head modulator, as given by $\omega_g/\omega_o$, should be at least 1.3, and $0.25+0.7(\omega_g/\omega_o)^2-0.8(\omega_g/\omega_o-1.25) \leq 1/(\omega_o\tau) \leq 0.25+0.7(\omega_g/\omega_o)^2+(\omega_g/\omega_o 1.25)$.

Methods and expressions for determining the value of $1/\tau$ and $\omega_g$ are presented in Sections II.2, II.4, II.7, II.8, II.11.D and II.11.F. An embodiment of a method for making a device that operates according to the present invention, i.e., falls within the aforementioned desirable operating regimes of FIG. 14, is described in Section II.12. To improve design accuracy, the methodology described in Section II.12 is used to provide a "first guess" at the device design, i.e., number of damping holes, etc. A device is then built according to the first guess, and then values of $1/\tau$ and $\omega_g$ are extracted from measured frequency response curves for the device, as described in Section II.8. If required, a scaling factor can then be determined as described in Section II.11.F to achieve optimum square response, i.e., adjust the device's operation to fall within the desired region of FIG. 14.

Using the methodology described in Section II, the maximum speed of a modulator having a typical configuration and limited to an ambient pressure of 1 atmosphere can be estimated. Assume a gap of 0.97 microns between the membrane and substrate (62 percent of a wavelength of the incident optical signal), a membrane diameter of 150 microns and a regular hole spacing such as illustrated in FIG. 15. From Section II.11.C, $f_g=1.3\ p^{0.5}$, where $f_g=\omega_g/(2\pi)$. So, at 1 bar pressure, $f_g=1.3$ MHz. Taking $\omega_g/\omega_o=2$ as a desirable minimum, then the natural resonant frequency $\omega_o$ of the modulator is $1.3/2=0.65$ MHz. Assuming that the bit rate of the modulator will be less than or equal to a maximum of three times the natural resonant frequency of the membrane, then, bit rate$=0.65\times 3 \approx 2$ Megabits per sec. Thus, to achieve bit rates greater than about 2 Megabits per second requires that the ambient pressure of the modulator is greater than atmospheric pressure.

Section II.

1.0 Introduction

In Section II of this specification, the underlying theory and model development for the invention described in Section I is presented. The model incorporates the essential elements of an actual gas-damped device for which the mechanical response can be determined analytically.

2.0 Model

Figure 1:
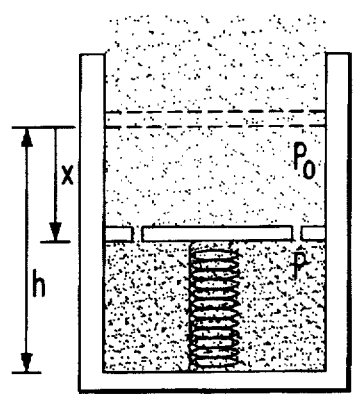
FIG. 1 illustrates a model device that forms the basis for analysis of the behavior of squeeze-type micromechanical devices presented herein.

The model device shown in FIG. 1 consists of a piston of mass, m, and cross-sectional area, a, that is supported within a cylinder by a mechanical spring having spring constant k. The piston has small holes that provide an escape for gas trapped in the cylinder. At equilibrium, the piston sits a distance, h, above the bottom of the cylinder. Because the assembly is located in a large volume, the gas pressure above the piston remains at the ambient gas pressure, $P_o$, independent of the piston's position and the instantaneous pressure, P, in the cylinder.

The equation of motion for the driven resonator is, $$m\ddot{x}=-kx-(P-P_o)a-\Gamma\dot{x}+F_o e^{i\omega t} \quad (1)$$

where x is the piston's displacement from equilibrium and $\Gamma$ is the ordinary damping constant associated with the piston's velocity. The solution of (1) is represented by the expressions $$x=Ae^{i(\omega t-\phi_1)} \quad (2)$$

and, $$P-P_o=Be^{i(\omega t-\phi_2)} \quad (3),$$

where, in general, $\phi_1=\phi_2$.

The simplification is made that the rate of gas flow through the holes in the piston is proportional to the instantaneous pressure difference $P-P_o$. That is, it is assumed that $$\dot{n}=-\xi(P-P_o) \quad (4)$$

In general, $\xi$ will be a very complicated function depending on many parameters, including the number, size, and physical arrangement of the holes in the piston; the gap size h; the type of gas used; and the mean free path of the gas molecules.

Combining Eq. 3 and 4 and integrating we find $$n-n_0=\frac{i\xi B}{\omega}e^{i(\omega t-\phi_2)}, \quad (5)$$

which when combined with the ideal gas law $$P-P_o=\frac{RT}{a}\left(\frac{n}{h-x}-\frac{n_0}{h}\right) \quad (6)$$

leads to $$P-P_o=P_o h\left(\frac{1}{h-x}-\frac{1}{h}\right)+\frac{i\xi B h P_o e^{i(\omega t-\phi_2)}}{\omega n_0(h-x)}. \quad (7)$$

We now let $x/h \ll 1$, so that $$\frac{1}{h-x} \to \frac{1}{h}\left(1+\frac{x}{h}\right) \quad (8)$$

and define $\tau$ by $$\frac{1}{\tau} \equiv \frac{P_o\xi}{n_0}=\frac{RT}{a}h\xi. \quad (9)$$

Note that $\tau$ is the characteristic time associated with the decay of the pressure in the fixed volume $ah$. Using Eqs. 8 and 9, Eq. 7 then becomes $$P - P_o = \frac{P_o x}{h} + \frac{iB}{\omega\tau} e^{i(\omega t - \phi_2)}. \tag{10}$$

Combining Eqs. 2, 3 and 10.

$$B\left(1 + \frac{i}{\omega\tau}\right) = \frac{P_o A}{h} e^{-i\phi_3} \tag{11}$$

with $$\phi_3 = \phi_1 - \phi_2. \tag{12}$$

Equating the magnitudes on both sides of Eq. 11 it follows that $$B = \frac{P_o A}{h \sqrt{1 + (\omega\tau)^{-2}}}. \tag{13}$$

Considering the phases in Eq. 11, $$\tan\phi_3 = (\omega\tau)^{-1} \tag{14}$$

Using Eqs. 2 and 10, Eq. 1 for the piston's motion can be written.

$$A\left[\omega_0^2 + \omega_g^2 - \omega^2 + i\left(\zeta e^{i\phi_3} + \frac{\omega\Gamma}{m}\right)\right] = \frac{F_o}{m} e^{i\phi_1} \tag{15}$$

where we have defined $$\omega_0^2 = \frac{k}{m}, \tag{16}$$

$$\omega_g^2 = \frac{aP_o/h}{m}, \tag{17}$$

and $$\zeta = \frac{Ba}{\omega\tau mA} = \frac{\omega_g^2}{\omega\tau \sqrt{1 + (\omega\tau)^{-2}}}. \tag{18}$$

The second expression for $\zeta$ in Eq. 18 follows from using Eq. 13 for B and Eq. 17 for $\omega_g^2$. It should be noted that $\omega_o$ is the resonant frequency of a simple piston in the limit $P_o \to 0$, and that $\omega_g$ is the resonant frequency of the piston in the limit that $k \to 0$.

Now, using Eqs. 14 and 18 we can write $$\zeta \sin\phi_3 = \left(\frac{\omega_g}{\omega\tau}\right)^2 \frac{1}{1 + (\omega\tau)^{-2}} \tag{19}$$

and $$\zeta \cos\phi_3 = \frac{\omega_g^2}{\omega\tau} \frac{1}{1 + (\omega\tau)^{-2}}. \tag{20}$$

Combining Eqs. 15, 19 and 20 we obtain $$A\left[\omega_0^2 + \frac{\omega_g^2}{1 + (\omega\tau)^{-2}} - \omega^2 + i\left(\frac{\omega_g^2}{\omega\tau} \cdot \frac{1}{1 + (\omega\tau)^{-2}} + \frac{\omega\Gamma}{m}\right)\right] = \frac{F_o}{m} e^{i\phi_1}. \tag{21}$$

Note that the imaginary term has two components: one due to the usual damping coefficient $\Gamma$, the second due to the out-of-phase component of the cylinder pressure. To simplify the discussion, we will assume that the term in $\Gamma$ is small enough to be neglected. The expressions for the displacement's amplitude and phase are then $$A = \frac{F_o/m\omega_o^2}{\sqrt{\left(1 + \frac{\omega_g^2/\omega_o^2}{1 + (\omega\tau)^{-2}} - \frac{\omega^2}{\omega_o^2}\right)^2 + \left(\frac{\omega_g^2/\omega_o^2}{\omega\tau} \cdot \frac{1}{1 + (\omega\tau)^{-2}}\right)^2}} \tag{22}$$

and $$\tan\phi_1 = \frac{\omega_g^2/\omega\tau}{(\omega_o^2 - \omega^2)(1 + (\omega\tau)^{-2}) + \omega_g^2}. \tag{23}$$

Eq. 22 can now be inserted into Eq. 13 for the pressure response to obtain $$B = \frac{P_o F_o/hm\omega_o^2}{\sqrt{2\left(1 - \frac{\omega^2}{\omega_o^2}\right)\frac{\omega_g^2}{\omega_o^2} + \left(1 - \frac{\omega^2}{\omega_o^2}\right)^2 (1 + (\omega\tau)^{-2}) + \frac{\omega_g^4}{\omega_o^4}}}. \tag{24}$$

The expression for $\phi_2$ can be obtained by using the trigonometric identity $$\tan(\phi_1 - \phi_3) = \frac{\tan\phi_1 - \tan\phi_3}{1 + \tan\phi_1 \tan\phi_3} \tag{25}$$

and Eqs. 14 and 23 for $\tan\phi_3$ and $\tan\phi_1$ respectively. We find $$\tan\phi_2 = \frac{1}{\omega\tau} \cdot \frac{(\omega^2 - \omega_o^2)}{(\omega_o^2 + \omega_g^2 - \omega^2)}. \tag{26}$$

3.0 Special Drive Frequencies

A. $\omega \to 0$

If there is at least one hole in the piston then $1/\tau \neq 0$ and Eqs. 22 and 24 yield in the limit of zero frequency, $A \to F_o/m\omega_o^2 = F_o/k$ and $B \to 0$. The motion of the piston is now slow enough to allow the cylinder pressure to remain at $P_o$. The restoring force is then due only to the mechanical spring.

B. $\omega \to \infty$

In this limit $A \to 0$ and $B \to 0$. Now the drive frequency is so large that the piston, because of its inertia, can not respond to the oscillatory force and remains stationary. Consequently, the cylinder pressure again remains at $P_o$.

C. $\omega\tau \ll 1$

If one thinks of the drive frequency as being fixed, this case corresponds to a very small value of $\tau$ and so to a piston with a very high porosity. Eq. 22 can now be written $$A = \frac{F_o/m\omega_o^2}{\sqrt{\left(\frac{\omega_o^2 - \omega^2}{\omega_o^2}\right)^2 + \left(\frac{\omega_g^2}{\omega_o^2} \omega\tau\right)^2}} \tag{27}$$

which has the form of the usual resonance equation. The resonance peak is now centered at $\omega = \omega_o$ and has a width determined by the quality factor Q, with $$Q = \frac{\omega_o}{\tau\omega_g^2}. \tag{28}$$

Because the piston is very porous, the gas can not contribute to the piston's restoring force and shift the resonant frequency. It is, however, responsible for the damping.

D. $\omega\tau \gg 1$

This is the opposite case of a piston with a very low porosity and with the trapped gas making its maximum contribution to the total restoring force. Eq. 22 now takes the form $$A = \frac{F_o/m\omega_o^2}{\sqrt{\left(\frac{\omega_o^2 + \omega_g^2 - \omega^2}{\omega_o^2}\right)^2 + \left(\frac{\omega_g^2}{\omega_o^2} \frac{1}{\omega\tau}\right)^2}} \quad (29)$$

which has a peak at $$\omega = \sqrt{\omega_o^2 + \omega_g^2} \ . \quad (30)$$

The effective quality factor $$Q = \frac{\omega_o \omega^2 \tau}{\omega_g^2} \quad (31)$$

now depends on the square of the drive frequency. $\omega_g < \sim \omega_o$ as is typically the case (See Sec. IV), and we consider $\omega$ small compared to $\omega_o$, but not so small as to violate the condition $\omega\tau \gg 1$, then Eq. 29 becomes $$A = \frac{F_o}{m\omega_o^2} \cdot \frac{1}{1 + \omega_g^2/\omega_o^2} . \quad (32)$$

So when $\omega_g$ is comparable to $\omega_o$, the low frequency amplitude falls significantly below the low frequency limit of $F_o/m\omega_o^2$. This behavior is very different from the usual high-Q resonance behavior (see e.g. Sec. 3.0C) where the low frequency amplitude remains roughly at the limiting value. A rapid decrease in the amplitude of the frequency response at low frequencies followed at higher frequencies by a sharp resonance peak immediately indicates a small porosity.

E. $\omega = \omega_o$

At this special frequency Eq. 24 for the pressure amplitude simplifies to $$B = \frac{P_o F_o}{hm\omega_o^2} \cdot \frac{\omega_o^2}{\omega_g^2} . \quad (33)$$

It is surprising that at this one frequency the pressure amplitude does not depend on the porosity (i.e. $\tau$) of the piston. On the other hand, we know from Sec. 3.0C that a very porous piston will exhibit a resonance of $\omega_o$ and undergo very large physical displacements. So as the porosity increases and gas can pass more easily through the piston, the physical amplitude of the piston's motion grows to a level just sufficient to maintain constant the amplitude of the pressure swings. Note too that the pressure is in phase with the drive, i.e. $\phi_2 \equiv 0$(Eq. 26).

F. $\omega = \sqrt{\omega_o^2 + \omega_g^2}$

As shown above in Sec. 3.0D. resonance occurs at this frequency when the piston has a very low porosity, i.e. when $\omega\tau \gg 1$. But independent of porosity and so independent of whether or not there is resonance behavior, the pressure at this frequency lags the drive according to Eq. 26 by precisely 90°.

G. $\omega = \omega_o \sqrt{1 + \omega_g^2/2\omega_o^2}$

At this frequency Eq. 28 for the displacement simplifies to $$A = \frac{F_o}{m\omega_o^2} \cdot \frac{2\omega_o^2}{\omega_g^2} . \quad (34)$$

Now it is the piston's amplitude which is independent of the porosity. Various types of plots will be presented the following sections which explicitly demonstrates all of these special cases.

4.0. Magnitude of $\omega_g$

Typically the characteristic frequency $f_o = \omega_o/2\pi$ of a micromechanical structure lies in the broad frequency range between low kHz and low MHz. In this section we estimate the gas frequency $f_g = \omega_g/2\pi$ and show that at atmospheric pressure this frequency is typically of the order of MHz and so generally greater than $f_o$.

The gas frequency was defined by Eq. 17, i.e.

$$\omega_g = \sqrt{\frac{\alpha P_o}{hm}} \ . \quad (35)$$

If the piston has uniform thickness t, then $$m = \alpha t \rho, \quad (36)$$

where $\rho$ is the density, and so we can write $$f_g = \frac{1}{2\pi} \sqrt{\frac{P_o}{ht\rho}} \ . \quad (37)$$

Figure 2:
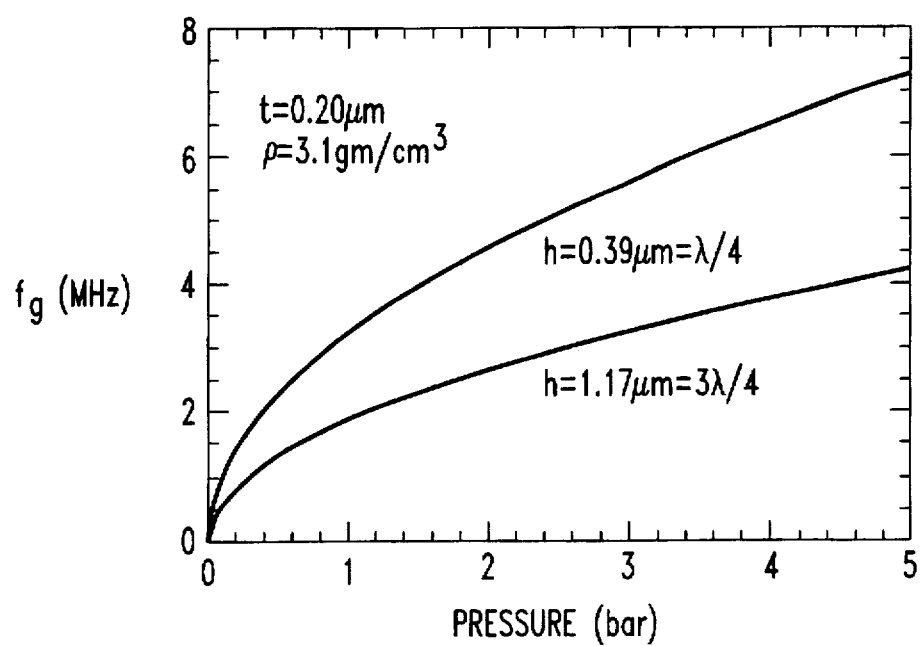
FIG. 2 is a plot of gas frequency $f_g$ versus pressure for two representative gap spacings.

In anticipation of the experimental results to be discussed in Sec. 11.0, we take as an example a piston made of silicon nitride ($\rho = 3.1$ gm/cm$^3$) with a thickness of 0.2 μm. The gap spacing is either 0.39 or 1.17 μm. These gaps correspond, respectively, to $\lambda/4$ or $3\lambda/4$ with $\lambda = 1.56$ μm, and are optimum spacings for the devices discussed in Sec. 11.0 to function as optical modulators. FIG. 2 shows $f_g$ for the two spacings plotted as a function of pressure.

It will be shown in Sec. 10.0, that it is desirable to have $f_g \geq 2f_o$. So, for example, if one requires $f_o$ to be 3 MHz, then $f_g$ should be 6 MHz. The curve for h=0.39 μm in FIG. 2 then shows that the ambient gas pressure will need to be of the order of 3 bar. Note too that $f_g$ and $f_o$ have the same mass dependence, so $f_g/f_o$ is independent of m.

5.0 Amplitude and Pressure Plots with $\omega_g/\omega_o = 2$

Figure 3:
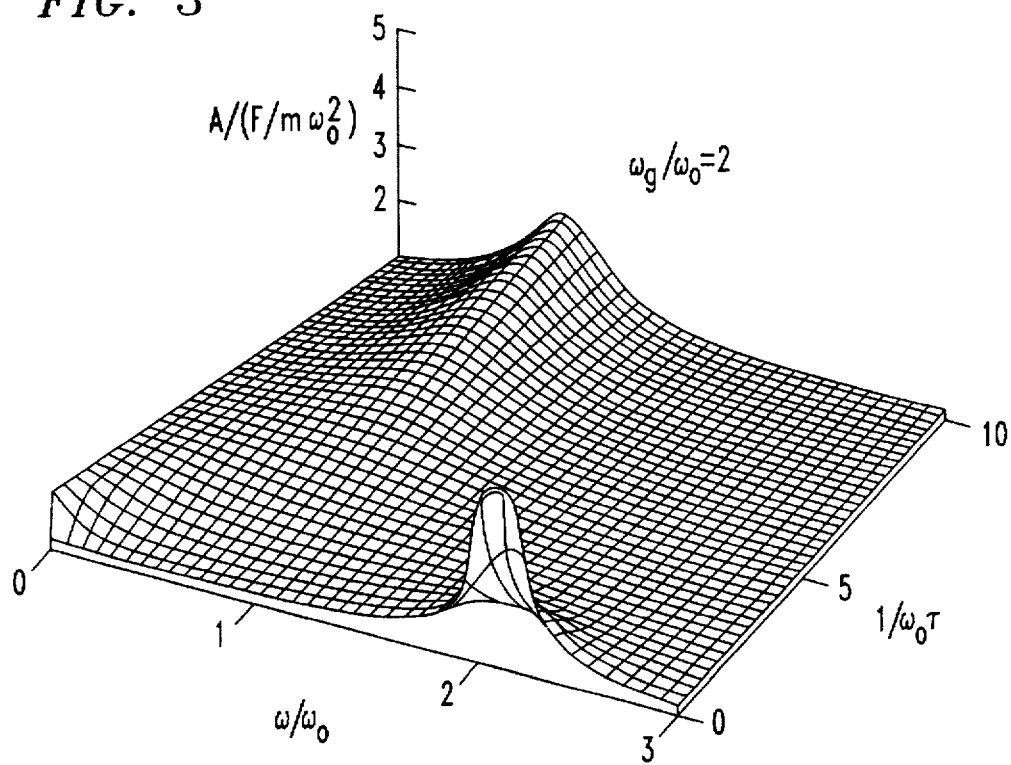
FIG. 3 is a plot showing displacement amplitude versus drive frequency versus piston porosity at fixed reduced gas frequency.

Many of the essential physical implications of our model are depicted in FIG. 3. This three-dimensional plot shows A (Eq. 21) versus $\omega$ and $1/\tau$, in dimensionless units, for $\omega_g/\omega_o$ fixed at 2.0. Remember that $1/\tau$ is a measure of the piston's porosity.

For low porosities (i.e. $1/\omega\tau_o \tau \approx 0$) there is a sharp resonance peak at $\omega/\omega_o \approx \sqrt{1 + \omega_g^2/\omega_o^2} = \sqrt{5}$ and at low frequencies a reduced response amplitude much smaller than one. As the porosity increases this behavior evolves, with the peak amplitude first decreasing and then reemerging near $\omega/\omega_o = 1$. For $1/\omega_o \tau \geq 10$, the frequency response shows more ordinary behavior with the reduced amplitude increasing monotonically from unity on the low frequency side of the peak. These two extreme cases for $1/\tau$ were discussed more quantitatively in Sec. 3.0.

In the transitional region the calculated response (with $\omega_g/\omega_o$ fixed at 2) does not exhibit any peak. This suggests the possibility of achieving critical damping for some specific value of $1/\omega_o\tau$.

Figure 4:
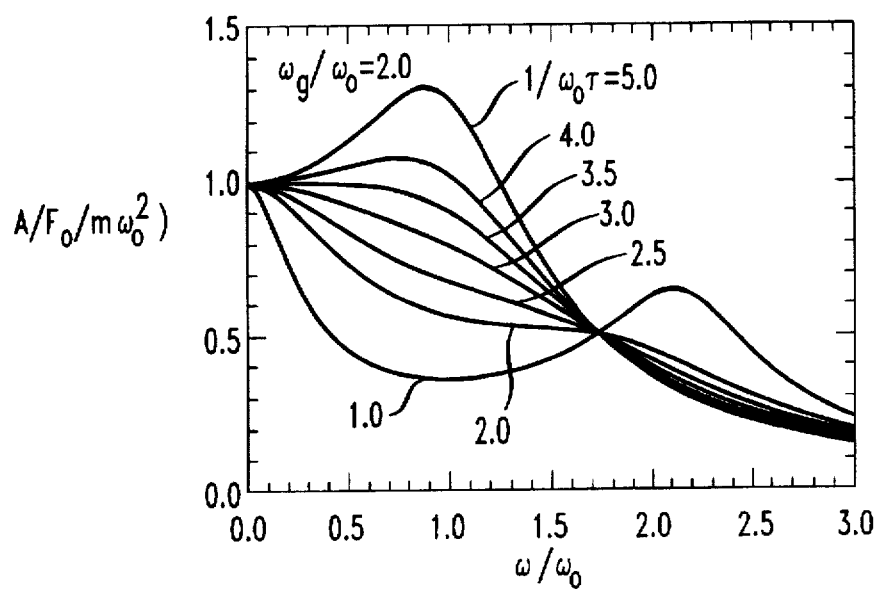
FIG. 4 is a plot showing displacement amplitude as a function of drive frequencies for various values of membrane porosity.

FIG. 4 shows, more quantitatively, the response amplitude at intermediate porosities with $\omega_g/\omega_o$ fixed at 2. The curve for $1/\omega_o\tau = 3$ shows near ideal behavior in the sense that one would not expect ringing to occur following a discontinuous change in the driving force. The response to a square-wave drive will be discussed in Sec. 9.0. Note too the node in the curves, which according to Sec. 3.0G, occurs at $\omega/\omega_o = \sqrt{1 + \omega_g^2/2\omega_o^2} = \sqrt{3}$ where $A/(F_o/m\omega_o^2) = 2\omega_o^2/\omega_g^2 = \frac{1}{2}$.

Figure 5A:
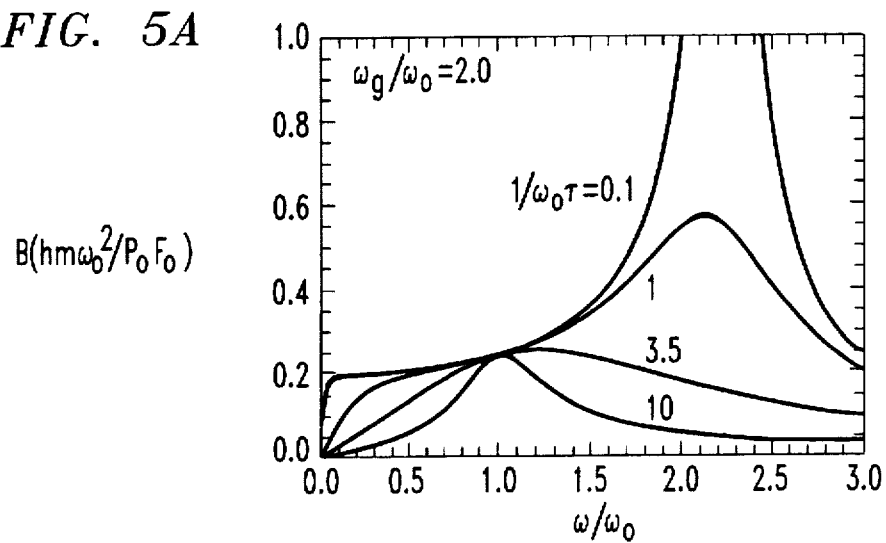
FIG. 5a is a plot of pressure amplitude as a function of drive frequency.
Figure 5B:
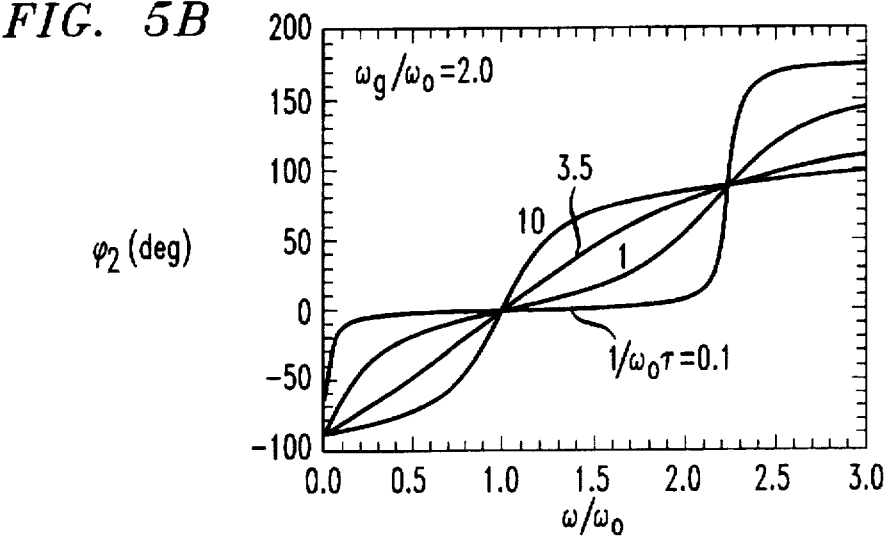
FIG. 5b is a plot of phase as a function of drive frequency.

FIGS. 5a and 5b shows the magnitude B and the phase $\phi_2$ of the pressure oscillations as a function of drive frequency. Curves are shown for several values of $1/\omega_o\tau$ and again with $\omega_g/\omega_o$ fixed at 2.0. For comparison, FIG. 5c shows curves for $\phi_1$, the phase of the displacement.

At $\omega=\omega_o$, the pressure oscillations have a magnitude which is independent of $\tau$ and are exactly in phase with the drive. At $\omega=\sqrt{\omega_o^2+\omega_g^2}$ the magnitude of the pressure variations grows as the piston's porosity decreases. Here the pressure lags the drive by 90°, independent of the value of $\tau$.

Figure 5C:
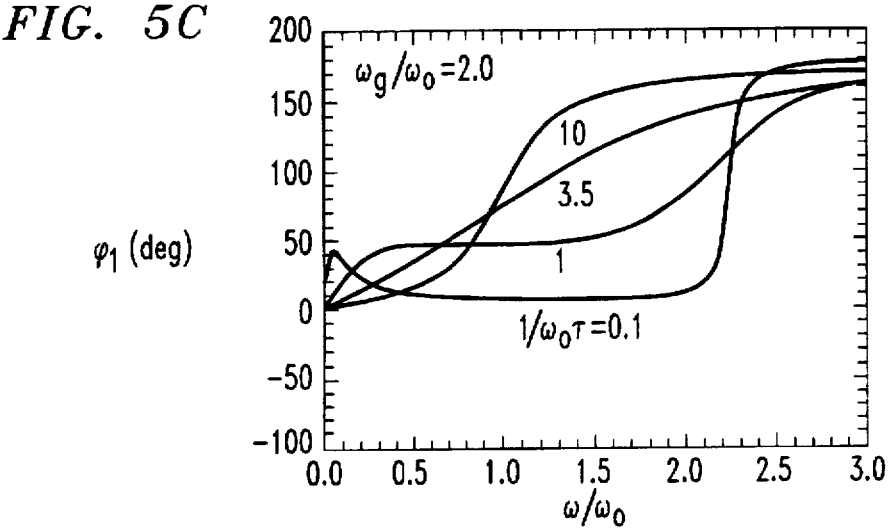
FIG. 5c is a plot of the phase of the displacement as a function of drive frequency.

The phase of the piston's displacement, shown in FIG. 5c, exhibits a more complicated dependence on $\tau$, with no nodes. >From this point of view, the pressure is the more fundamental parameter.

6.0 Constraint on $\omega_g$ for Critical Damping

FIG. 4 of the previous section suggests that critical damping can be achieved by adjusting the piston's porosity. Here we demonstrate that this is not generally true and that $\omega_g/\omega_o$ must be sufficiently large.

Figure 6A:
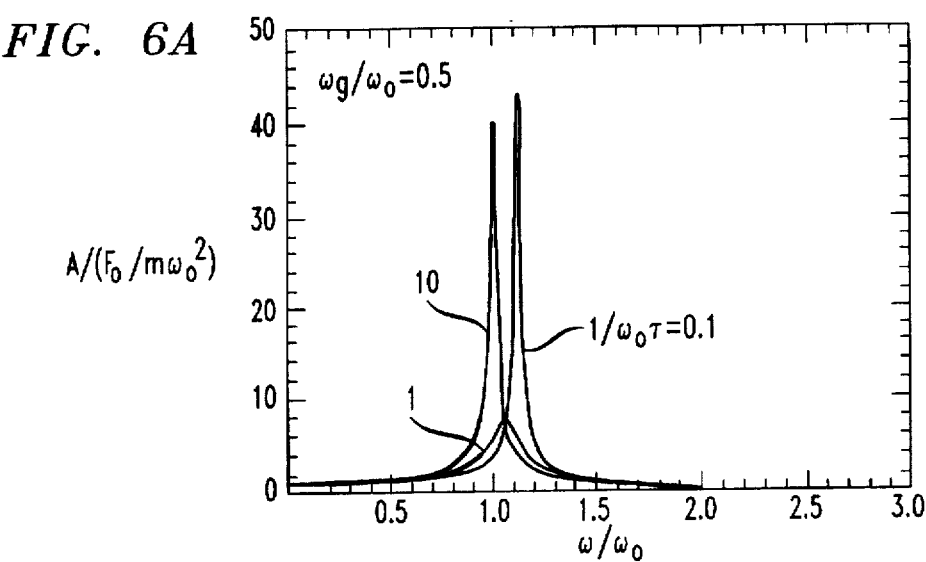
FIGS. 6a–c are plots of displacement amplitude versus drive frequency for different values of reduced gas frequency.
Figure 6B:
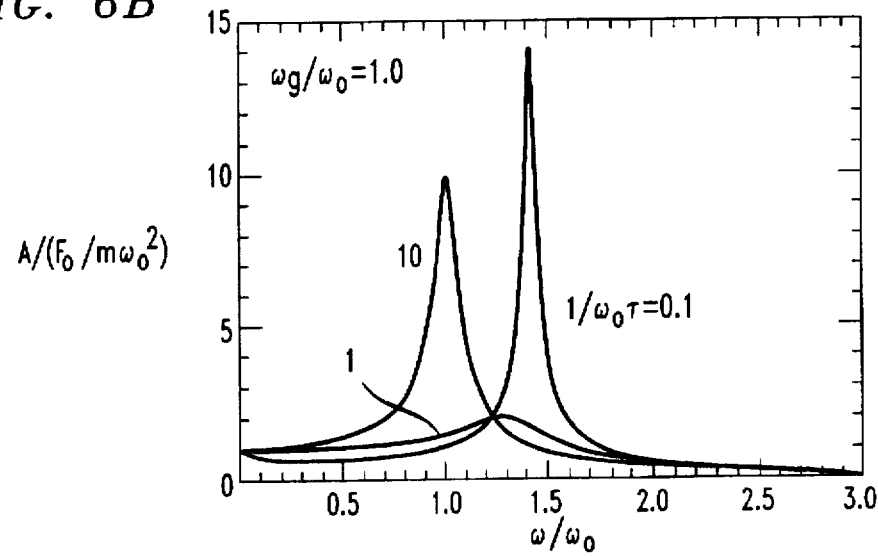
Figure 6C:
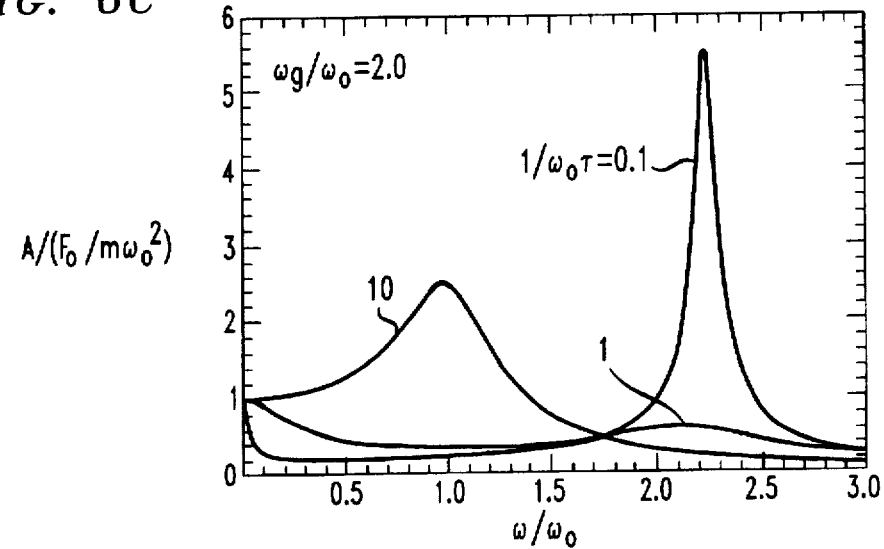

The displacement amplitude A is plotted for several different fixed values of $\omega_g/\omega_o$ in FIGS. 6a–c. FIG. 6c has $\omega_g/\omega_o=2$, as in FIGS. 3 and 4. FIGS. 6a and b show the corresponding curves with $\omega_g/\omega_o$ fixed at 0.5 and 1.0, respectively. Note the different ordinate axis scales and the fact that the two curves with $1/\omega_o\tau=1$ now have significant peaks, implying that it may be impossible to obtain sufficient damping at these smaller gas frequencies.

Figure 7A:
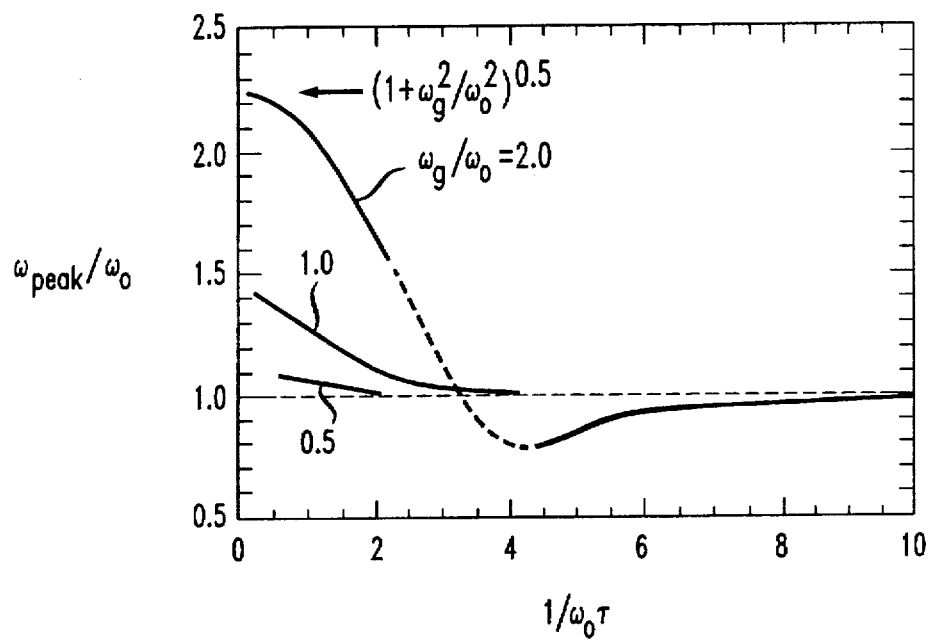
FIG. 7a is a plot of drive frequency as a function of piston porosity.
Figure 7B:
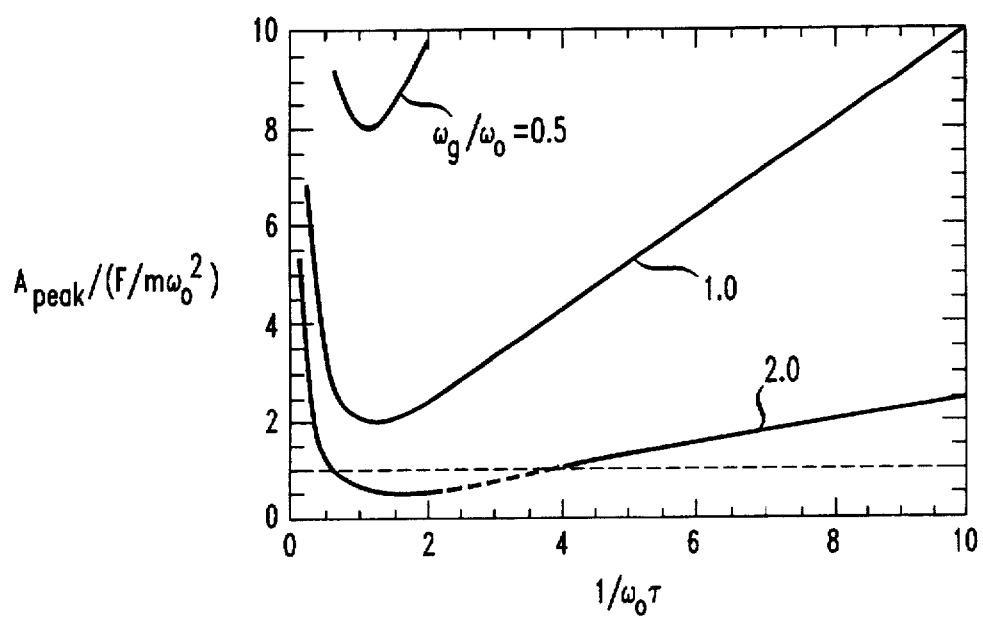
FIG. 7b is a plot of displacement amplitude versus piston porosity.

This is in fact the case as demonstrated in FIGS. 7a and 7b. Here the amplitude and frequency at the resonance peak is plotted as a function of piston porosity. Curves are shown for $\omega_g/\omega_o$ fixed at 0.5, 1.0, and 2.0. The dashed portions of the curves for $\omega_g/\omega_o=2$ indicate the porosity region where the response curves do not exhibit a well-defined maximum. When $\omega_g/\omega_o=0.5$, the reduced peak amplitude never drops below 8 (i.e. Q≈8); at $\omega_g/\omega_o=1$, the minimum amplitude is 2. It is only at even higher reduced gas frequencies that the amplitude can be brought below unity and into a region of appreciable damping. So independent of the piston porosity, critical damping can not be achieved unless $\omega_g/\omega_o \gtrsim 2$. This result is especially important for devices designed to work at frequencies above a few MHz, since it implies that the ambient gas pressure will have to be greater than atmospheric pressure.

7.0 Qualitative Behavior of $\tau$

At atmospheric pressure, the mean free path (mfp) of a gas molecule is of the order of a micron and so small compared to the dimensions of ordinary-sized systems, but comparable to the dimensions of typical micromechanical structures. The flow of gas within these devices, therefore, can not be described as being either viscous or molecular. This makes quantitative theoretical calculations extremely difficult and dependent upon the particular device being modeled. Here we derive only the expected qualitative dependences of $\tau$ on various parameters for the two limiting cases of very short and very long mean free paths in order to obtain a functional form appropriate for fitting experimental data and for extracting effective parameters.

A. $\tau$ for the simple piston model

In the following, it is assumed that the piston thickness t is small compared to the diameter d of the damping holes, so that each hole becomes an orifice and the parameter t does not enter into any of the mathematical expressions. The amplitude of displacement is also assumed to be small compared to the gap spacing h. Consequently, the pressure variations are small and the average pressure is close to $P_o$. We also assume that the center-to-center hole spacing is small compared to the gap spacing h, so that the flow impedance is dominated by the orifice contribution.

1. mfp>>r, molecular flow regime

When the mean free path is large, one would expect the net number of molecules leaving the cylinder per unit time to be proportional to the product of the difference in number densities, the average molecular speed, and the total open area of the orifice. This leads to the relation $$\dot{n} \sim \frac{-(P-P_o)}{\sqrt{TM}} \cdot Nd^2 \quad (38)$$

Here N is the number of orifices of diameter d, T is the absolute temperature, and M is the molecular mass. Using Eq. 4, relating n and $\xi$, and Eq. 9, relating $\tau$ and $\xi$, it follows from Eq. 38 that $$\frac{1}{\tau} \sim \frac{G_m}{ah} \left(\frac{T}{M}\right)^{1/2}. \quad (39)$$

with $G_m=Nr^2$.

2. mfp<<d, viscous flow regime

When the mean free path is small viscosity has meaning and the flow of gas through a tube of length L, which is long compared to its diameter, is given by $$\dot{n} \sim G_V \cdot \frac{P_o(P-P_o)}{T\eta}. \quad (40)$$

Here $\eta$ is the gas viscosity and the geometric factor $G_v$ is $d^4/L$. For an orifice, rather than a long tube, one might expect Eq. 40 to remain valid but with $G_v$ a function only of d. Combining Eqs. 4, 9, & 40 we have $$\frac{1}{\tau} \sim \frac{G_V}{ah} \cdot \frac{P_o}{\eta}. \quad (41)$$

In contrast to Eq. 39 for $1/\tau$ in the molecular flow regime, we now find that $1/\tau$ is proportional to $P_o$ and depends on the gas type only through the viscosity.

According to simple kinetic theory, $$\eta \sim \frac{M^{1/2}}{d_m^2} T^{1/2} \quad (42)$$

where $d_m$ is the diameter of the gas molecule. This relation and Eq. 41 indicate that $1/\tau$ in the viscous flow regime is proportional to $T^{31/2}$. In the molecular flow region $1/\tau$ is proportional to $T^{1/2}$, see Eq. 39.

Figure 8:
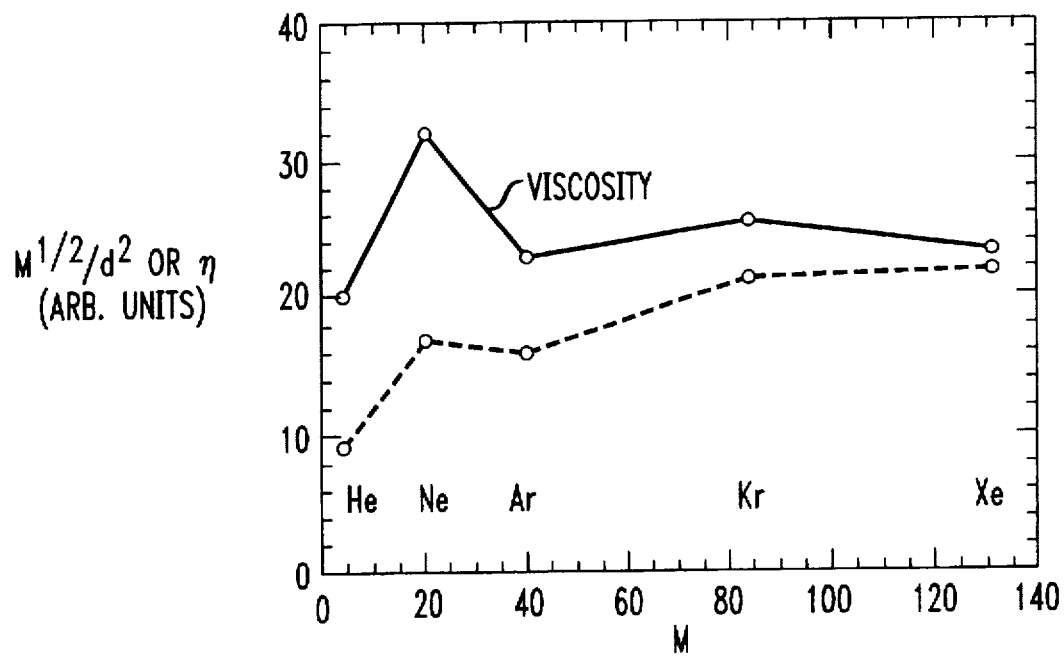
FIG. 8 shows the viscosities of the rare earth gases compared with the molecular mass and molecular diameter dependence from simple kinetic theory.

FIG. 8 shows $M^{1/2}/d_m^2$ plotted versus M for the rare gases. For comparison, we also show the known viscosities in arbitrary units, (see also Table I), to demonstrate general consistency with Eq. 42. The anomalously large viscosity for neon will be apparent in experimental data to be presented in Sec. 11.0. Ignoring Ne, one would expect that $1/\tau$ in the viscous flow regime would be nearly independent of gas type and so depend only on pressure.

In Sec. 11.0 results will also be presented for devices in $H_2$. With a molecular mass half that of helium, and with a viscosity also half that of helium, $1/\tau$ in both flow regimes will be larger than for any of the rare gases.

3. mfp≈d, Knudsen regime

As already noted at the beginning of this section, for typical micromachined structures, one is not clearly in either limiting flow regime at atmospheric pressure. However, at very low pressures one can reach into this molecular flow regime and at high pressures into the viscous flow regime.

Empirically we find that an expression of the form $$\frac{1}{\tau} = \sqrt{\alpha^2 + \beta^2 P^2} \quad (43)$$

can be used to accurately fit our experimental results for 0.5<P<3 bar. And consistent with the above discussion we find that a $\alpha=\alpha(M)$ and $\beta=\beta(\eta)$ but with functional dependences different from those derived for the simple piston model.

B. τ for real devices

Figure 9:
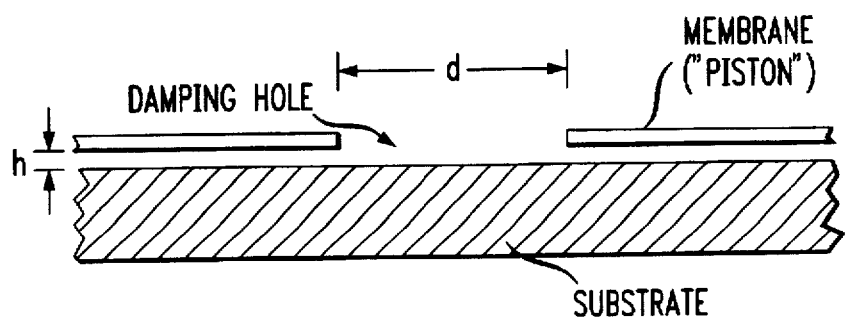
FIG. 9 shows a cross section of a simplified representation of a modulator in the region of a damping hole.

For the experimental devices to be discussed later both the damping hole diameter and the center-to-center hole spacing are large compared to the gap spacing h, as shown in FIG. 9. Consequently the gas is confined to flow parallel to the substrate and radially toward an opening with area $2\pi r \cdot h$ (not $\pi r^2$ as above). Moreover, the rate at which gas escapes from under the piston is determined not only by the size and number of these holes but also by the impedance provided by the narrow gap. One should therefore not expect agreement with either Eq. 39 or Eq. 41.

On the other hand, empirical findings to be discussed in Sec. 11.0, are much simpler than one might have expected. For our particular devices, and to a good approximation, we find that $$\alpha \sim M^{-\frac{1}{4}} \tag{44}$$

and $$\beta \sim \eta^{-\frac{1}{2}}. \tag{45}$$

8.0 Method For Extracting $\omega_g$ and τ from Frequency Response Curves

The mechanical frequency response of a device is mapped out experimentally by simply sweeping the frequency of a constant-amplitude driving force while detecting the amplitude of the resulting physical motion. See Sec. 11.0 for several examples. The exact shape of this curve will depend on the temperature, the pressure, and on the type of gas surrounding the structure. Of course, at zero pressure there will be no gas damping and so in general, one would expect a sharp resonance at the natural frequency $f_o$. As the pressure is increased from zero the resonance peak decreases in amplitude and shifts in frequency. It is convenient to characterize each curve by two dimensionless quantities: $f_{peak}/f_o$ and $A_{peak}/A_{\omega=0}$ where $A_{\omega=0}$ is the amplitude in the limit of zero frequency. In this section we discuss the correspondence between these directly measured quantities and the two parameters of the model, namely $\omega_g$ and $1/\omega_o\tau$.

Figure 10A:
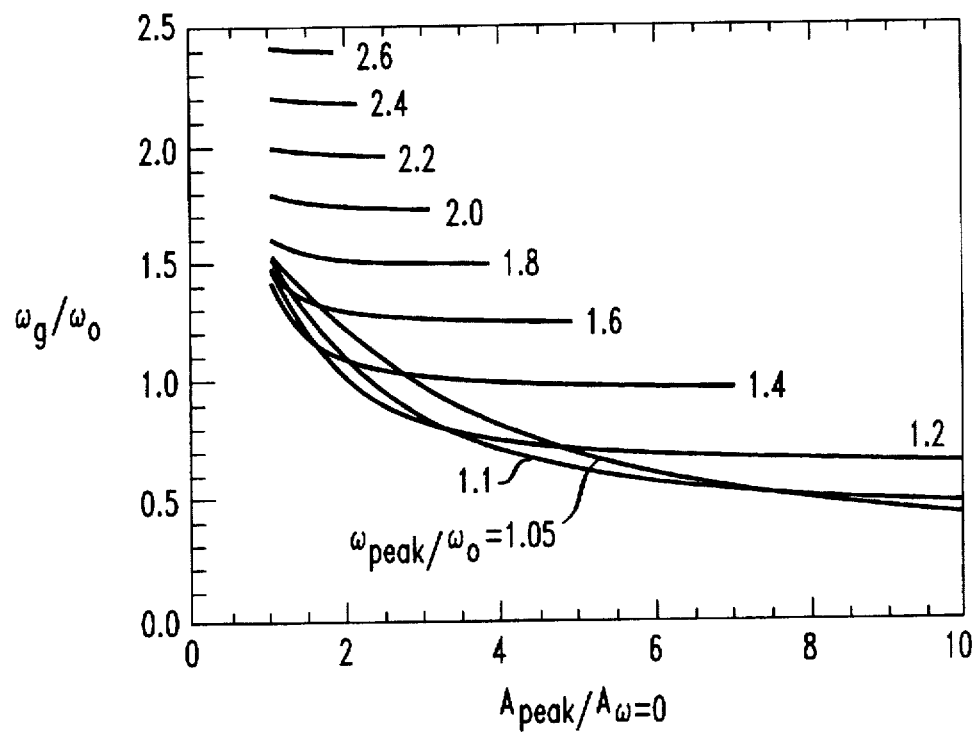
FIG. 10a is a plot of reduced gas frequency versus reduced peak amplitude.
Figure 10B:
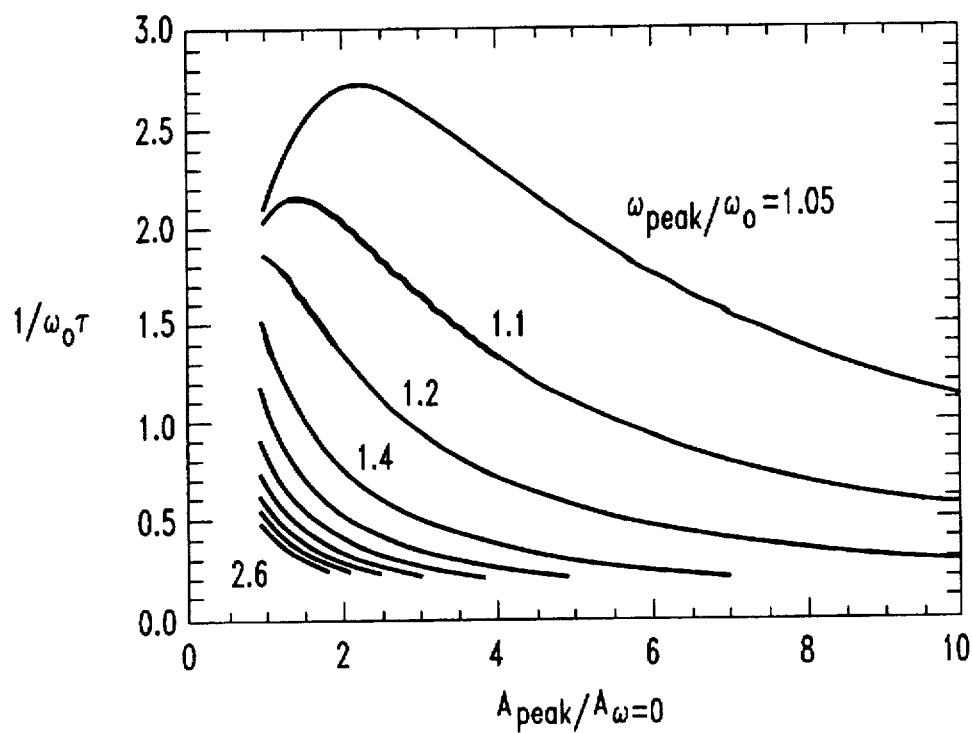
FIG. 10b is a plot of piston porosity versus reduced peak amplitude.
Figure 11E:
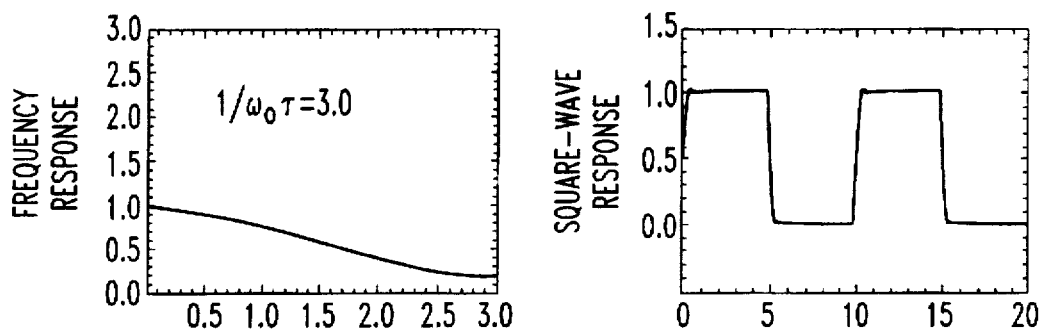
Figure 11F:
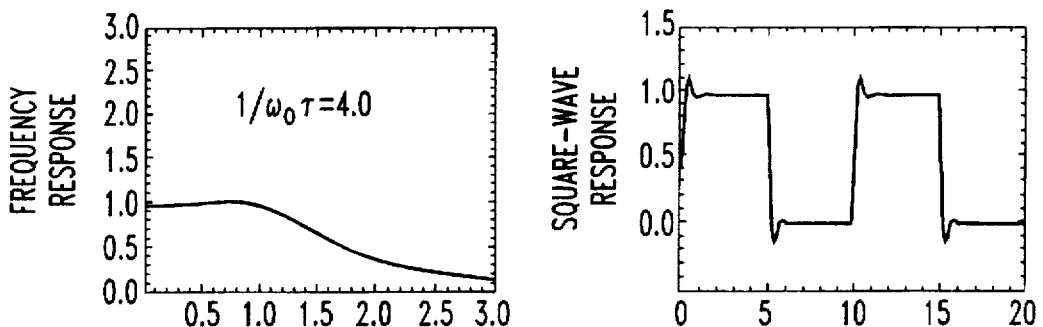
Figure 11G:
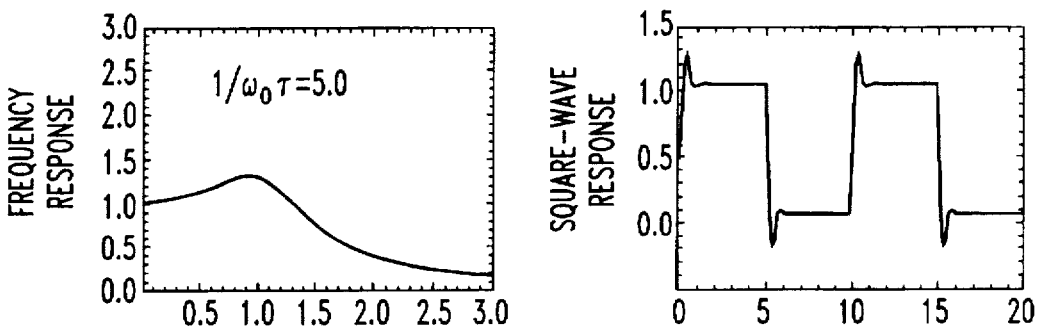
Figure 11H:
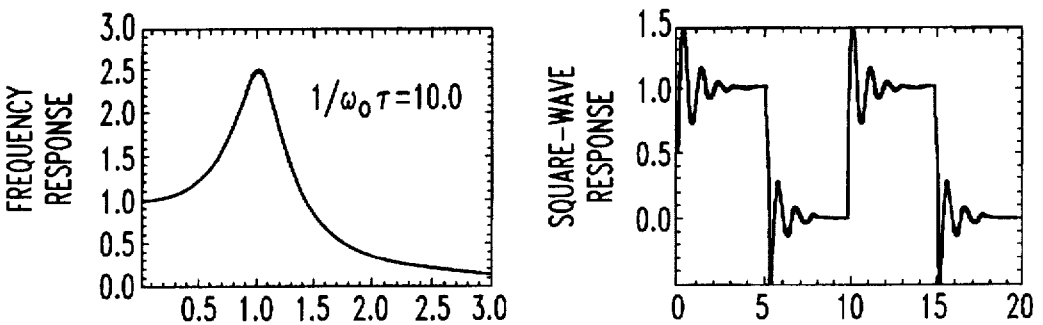
Figure 12A:
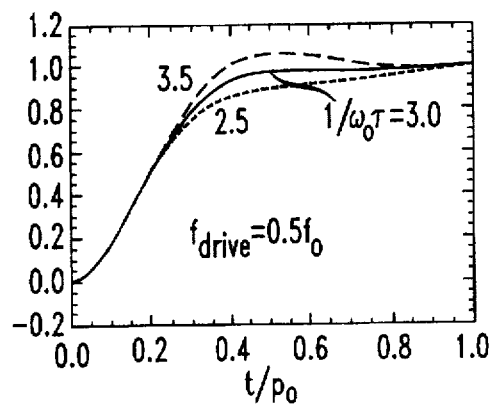
FIGS. 12a–d show plots of the square wave response for various drive frequencies at a reduced gas frequency of 2 and several values of piston porosity.
Figure 12B:
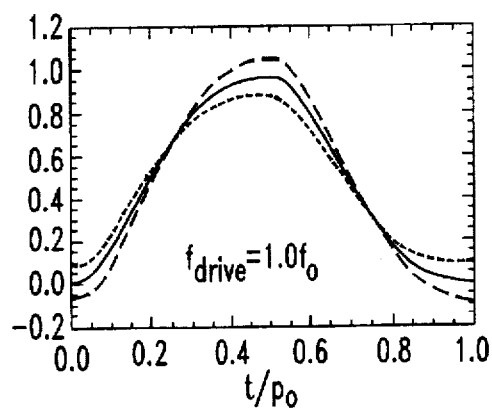
Figure 12C:
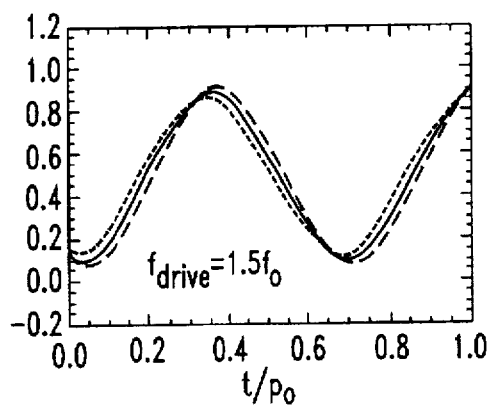
Figure 12D:
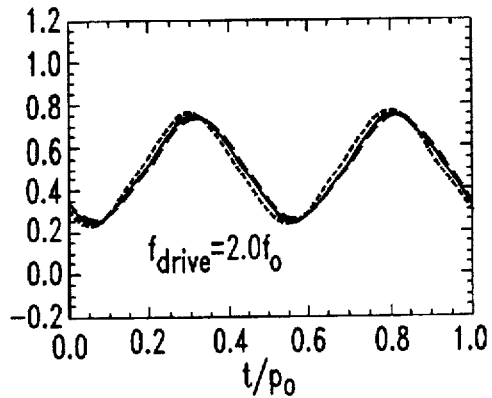

FIGS. 10a, b show $\omega_g/\omega_o$ and $1/\omega_o\tau$ plotted versus $A_{peak}/A_{107=0}$ along several curves corresponding to fixed values of $\omega_{peak}/\omega_o$. These curves were generated by numerically scanning $\omega_g/\omega_o$ and $1/\omega_o\tau$ to search for pairs of values which imply, via Eq. 22, a resonance peak at a given fixed value of $\omega_{peak}/\omega_o$. The corresponding reduced amplitude $A_{peak}/A_{107=0}$ was also recorded. The curves in FIGS. 10a and 10b were terminated at an absissa value of unity to simplify the plot and also because at very small amplitudes the resonance is broad and so the uncertainty in $f_{peak}$ is large. The termination at the opposite end of each curve is a consequence of the grid size used to scan values of $\omega_g/\omega_o$ and the fact that all of the curves approach horizontal behavior at large amplitudes. Because each curve is single valued as a function of amplitude, $\omega_g/\omega_o$ and $1/\omega_o\tau$ can be determined uniquely given $f_{peak}/f_o$ and $A_{peak}/A_{\omega=0}$.

As an example use of this figure, consider a device with a natural frequency of 1 MHz which under a given pressure has a resonance at 1.2 MHz with a reduced amplitude of 2. Following the curves with $\omega_{peak}/\omega_o=1.2$ one finds that at $A_{peak}/A_{\omega=0}2$, $\omega_g/\omega_o$ is about 1.0 and $1/\omega_o\tau$ is about 1.3. A simple modification of the computer program used to create FIG. 10 directly converted the experimental input values into the parameters of the model. For the above example the routine yielded the more-quantitative values, $\omega_g/\omega_o=1.003$ and $1/\omega_o\tau=1.336$.

9.0 Response to a Square-Wave Drive

High-speed switching applications require devices whose response to a discontinuous step change in drive exhibits a short rise time and no significant ringing. In this section we determine the response to a square-wave drive by simply summing the complex frequency responses to the Fourier components of the drive signal.

A square-wave drive signal which switches between 0 and 1 with a period P can be written as the Fourier series $$F(t) = \frac{1}{2} + \sum_{j=1,3,...} \frac{2}{j\pi} \sin\left(\frac{2\pi j t}{P}\right) \tag{46}$$

It is convenient to use dimensionless quantities, and work with time measured in units of the natural period of the structure, i.e. $p_0=1/f_o$.

With the definitions $$\bar{t} = t/p_0, \tag{47}$$

$$\bar{P} = P/p_0, \tag{48}$$

$$\bar{\omega}_j = \frac{\omega_j}{\omega_o} = \frac{2\pi j}{\bar{P}} \tag{49}$$

and $$a_j = \frac{2}{j\pi} \tag{50}$$

Eq. 46 can be written $$F(\bar{t}) = \frac{1}{2} + \Sigma\, a_j \sin(\bar{\omega}_j \bar{t}) \tag{51}$$

Summing the piston's complex frequency response corresponding to each of the Fourier components of the square-wave drive, the normalized response is $$R(\bar{t}) = \frac{1}{2} + \sum_{j=1,3,...} a_j \cdot \bar{A}(\bar{\omega}_j) \cdot \sin(\bar{\omega}_j \bar{t} - \phi_1). \tag{52}$$

The quantities $\bar{A}$ and $\phi_1$ are given by Eqs. 22 and 23, which in reduced units take the forms $$\bar{A} = Am\omega_o^2/F_o + \left[\frac{\bar{\omega}_g^2}{\bar{\omega}\bar{\tau}} \cdot \frac{1}{1+(\bar{\omega}\bar{\tau})^{-2}}\right] \tag{53}$$

and $$\tan\phi_1 = \frac{\bar{\omega}_g^2/\bar{\omega}\bar{\tau}}{(1-\bar{\omega})^2(1+(\bar{\omega}\bar{\tau})^{-2})+\bar{\omega}_g^2}. \tag{54}$$

Here $$\bar{\omega}=\omega/\omega_0, \tag{55}$$

$$\bar{\omega}_g=\omega_g/\omega_0, \tag{56}$$

and $$\bar{\tau}=\omega_o\tau. \tag{57}$$

FIGS. 11a–h shows square-wave response curves calculated using Eq. 52 (with $j_{max}=301$) along with the corresponding frequency response curves based on Eq. 53. All of the curves are for $\omega_g/\omega_o=2$. The value of $1/\omega_o\tau$ is varied between the Figures with $1/\omega_o\tau=0.2, 0.5, 1.0, 2.0, 3.0, 4.0, 5.0$ and 10.0 for FIGS. 11a–11h, respectively. Time for the square-wave response curves is measured in units of the natural period $p_o=1/f_o$.

For small values of $1/\omega_o\tau$, where the frequency response curves show a dramatic drop in amplitude at low frequencies, the square-wave response curves exhibit behavior which is characterized by two very-different time scales: the first is determined by τ, the second by $f_{peak} \approx \sqrt{f_o^2+f_g^2} \approx \sqrt{5}$. For large values of $1/\omega_o\tau$, corresponding to a very porous piston, both of the response curves are very similar to those of an ordinary underdamped oscillator. Because $f_{peak}$, in this limit, is close to the natural frequency $f_o$, the ringing is now at a much lower frequency than in the low porosity regime.

Near-optimal response is achieved when $1/\omega_o\tau\approx3$. Here the square wave response has a rise time characterized by $f_o$ and does not exhibit ringing. Note that the frequency response curve now shows no remnant of any resonance peak.

In FIGS. 12a–d we show the square-wave response of this optimal device for drive frequencies on the order of $f_o$. Curves are also included for $1/\omega_o=2.5$ (dotted) and for $1/\omega_o=3.5$ (dashed). As the drive frequency is increased above $f_o$ the full amplitude swing between 0 and 1 can no longer be achieved. However if, for example, a swing between 0.1 and 0.9 is acceptable then the operating range can be extended to $1.5f_o$, which implies a bit rate of $3f_o$.

10.0 $\omega_g/\omega_o$ and $1/\omega_o\tau$ for Optimum Square-Wave Response

In the preceding section it was demonstrated that nearly-ideal square-wave response could be achieved for one particular pair of parameters, namely $\omega_g/\omega_o=2$ and $1/\omega_o\tau=3$. Other pairs of values, however, will yield similar results. In this section we map out a more general relationship for optimum response.

Figure 13:
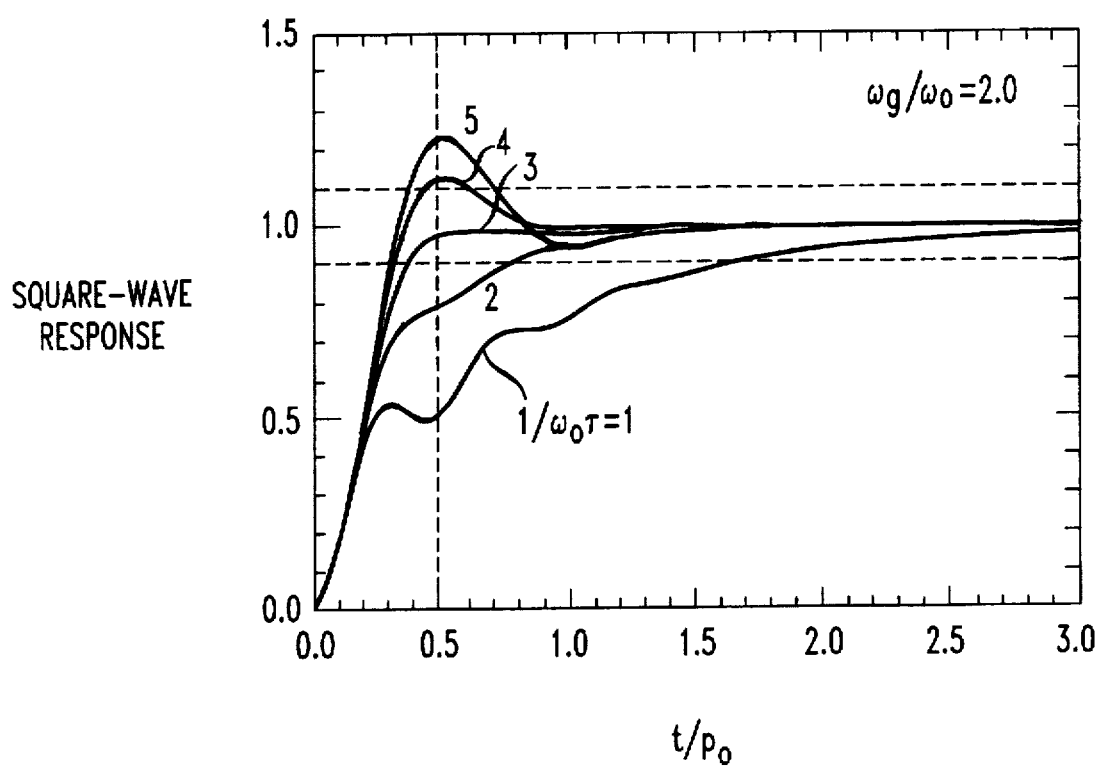
FIG. 13 is a plot of the square wave response to a discontinuous change in drive for times comparable to the natural period $p_o$.

The range of parameter values giving acceptable square-wave response was extracted from plots similar to the one shown in FIG. 13. Here the response calculated using Eq. 52 is plotted versus time measured in units of the natural period. For this example the parameter $\omega_g/\omega_o$ is fixed at 2.0 and the individual curves correspond to various values of $1/\omega_o\tau$ ranging from 1 to 5.

The amount of ringing was quantified simply by considering the normalized amplitude of response at a time $p_o/2$ following an instantaneous step in the drive signal. The dashed horizontal lines in the figure correspond to the upper and lower amplitudes for "10% ringing". The larger amplitude is reached when $1/\omega_o\tau=3.8$; the lower when $1/\omega_o\tau=2.4$. So if $\omega_g/\omega_o=2$ and $2.4\leq 1/\omega_o\tau\leq 3.8$; the square-wave response will show less than 10% ringing. If $2.7\leq 1/\omega_o\tau\leq 3.4$ the ringing will be less than 5%.

The limits on $1/\omega_o\tau$ determined for various values of $\omega_g/\omega_o$ were used to map out the 5% and 10% boundaries in a plot of $1/\omega_o\tau$ versus $\omega_g/\omega_o$, FIG. 14. Note that there are sizable ranges of acceptable values for both parameters and also that there are threshold values for both parameters: $\omega_g/\omega_o$ must be greater than about 1.5 and $1/\omega_o\tau$ must be greater than about 2.0. If $\omega_g/\omega_o$ is not greater than 1.5, a clean square wave response can not be achieved, independent of the piston's porosity.

11.0 Comparison with Experiment

Detailed measurements were made on eight micromachined devices. Each had the structure of a cylindrical drum with a stressed drumhead membrane of silicon nitride. The membrane was covered with an annular metal plating (100 Å of Ti, 500 Å of Au). This electrode and the doped silicon substrate formed a capacitor, allowing the resonator to be excited electrostatically. The resulting motion of the membrane was detected by measuring the modulation in the reflectivity of the unplated, transparent central portion of the membrane. Interference effects alter the reflectivity because the thickness of the membrane as well as the size of the gap under the membrane are both comparable to the optical wavelength.

FIGS. 15a–d shows schematically, but to scale, the four damping hole arrangements examined. Each of these layouts was used with two different gap spacings, namely 0.39 μm and 0.97 μm, accounting for the eight test devices. The dashed circle indicates the size of the drumhead; the dark shading shows the metal electrode; and the small white circles indicate the damping holes which pass through both the electrode and the membrane. These holes have diameters of either 3 or 5 μm and lie on circles with diameters of 40, 70, or 100 μm. The drumhead diameters are 150 μm for (a), (b), and (c) and 120 μm for (d). Various parameters for each of the test devices are listed in Table II, along with the assigned sample numbers used throughout this section.

A. Frequency Response: Peak Amplitude and Frequency

Figure 16:
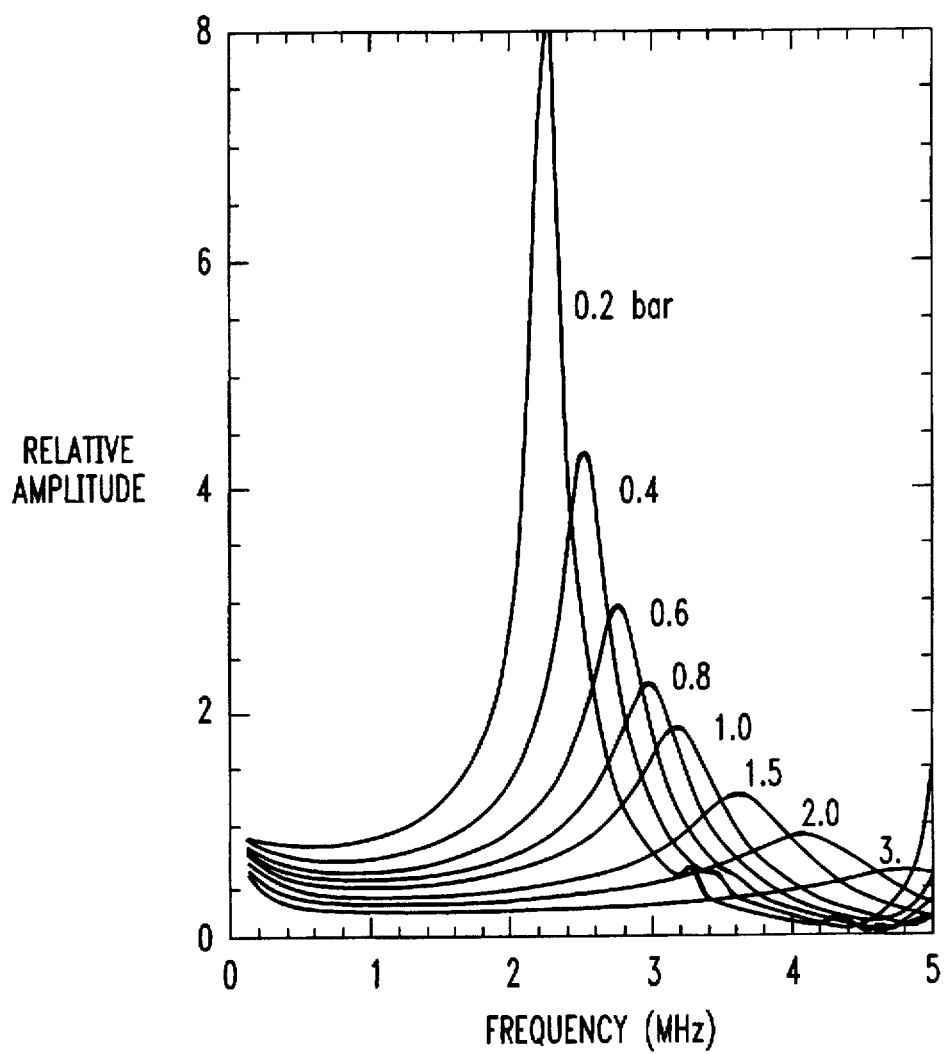
FIG. 16 shows measured resonance curves for exemplary drumhead modulator no. 2 at various helium pressures.
Figure 17:
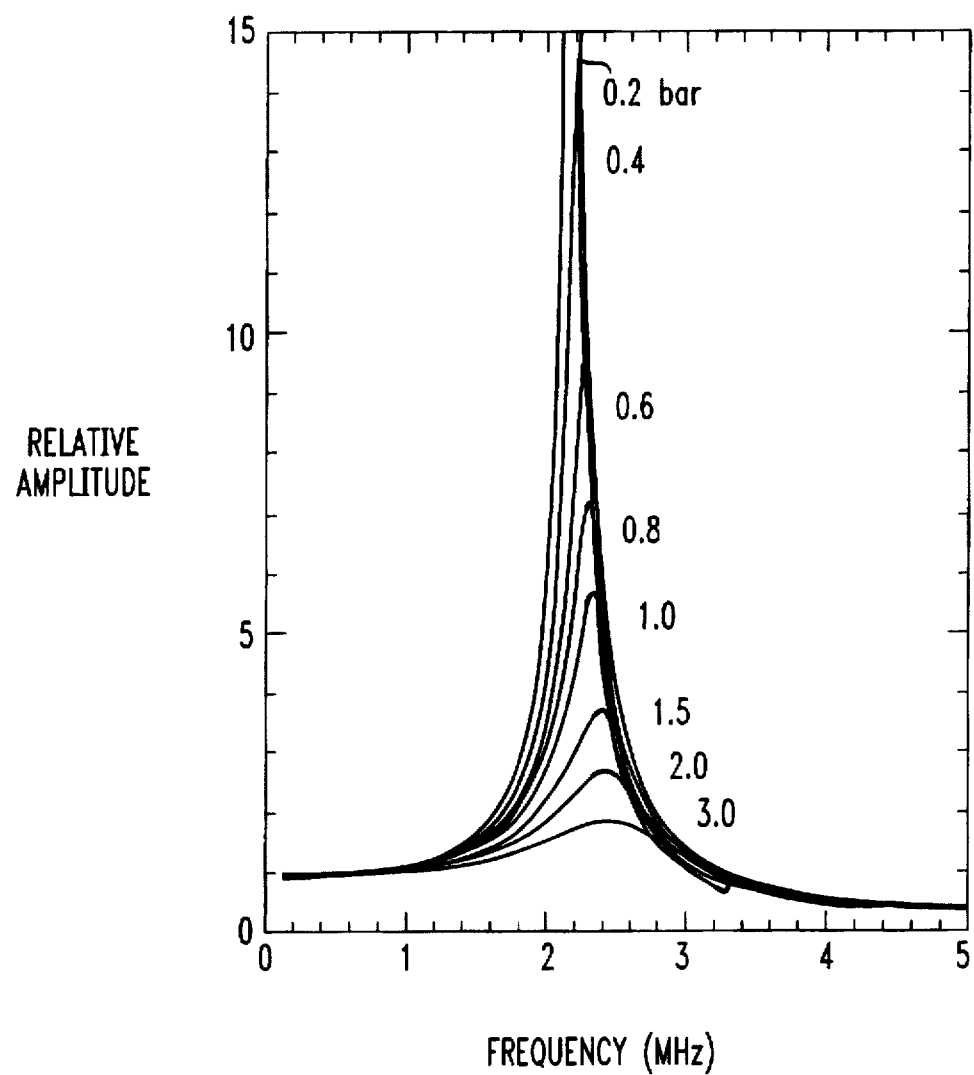
FIG. 17 shows measured resonance curves for exemplary drumhead modulator no. 5 at various helium pressures.
Figure 18A:
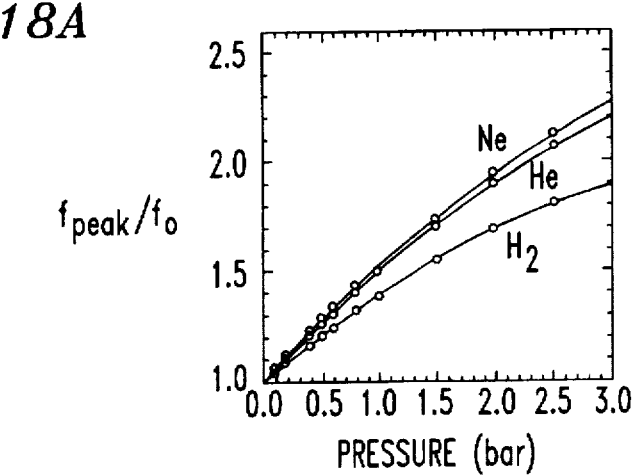
FIGS. 18a–f show measured peak frequencies as a function of pressure for exemplary drumhead modulators nos. 1–6 in hydrogen, helium and neon atmospheres.
Figure 18B:
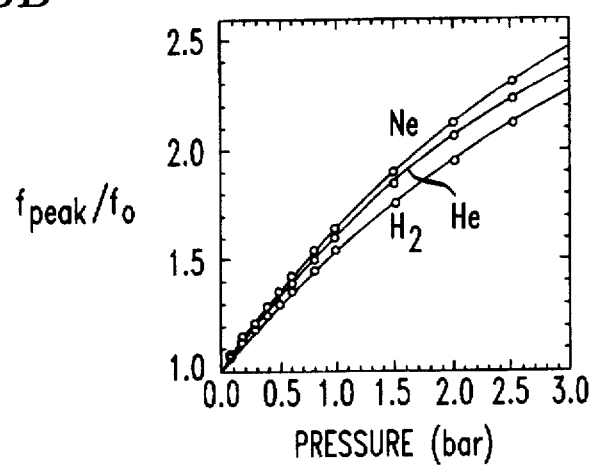
Figure 18C:
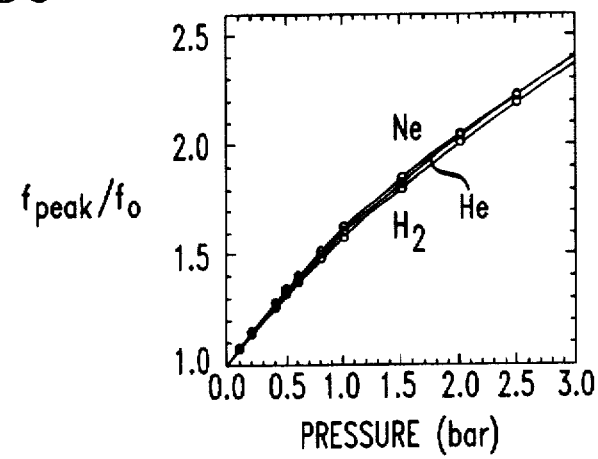
Figure 18D:
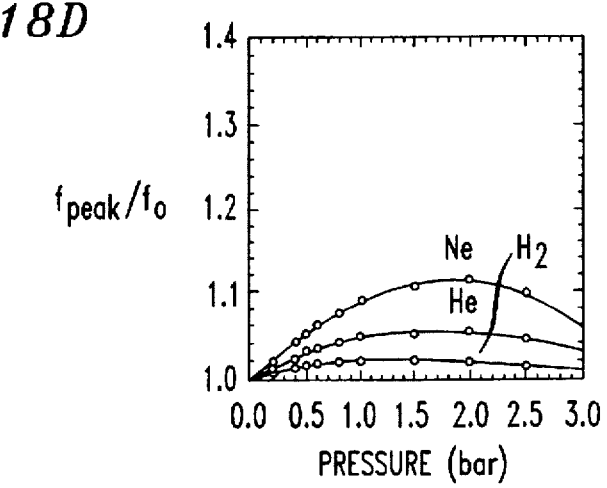
Figure 18E:
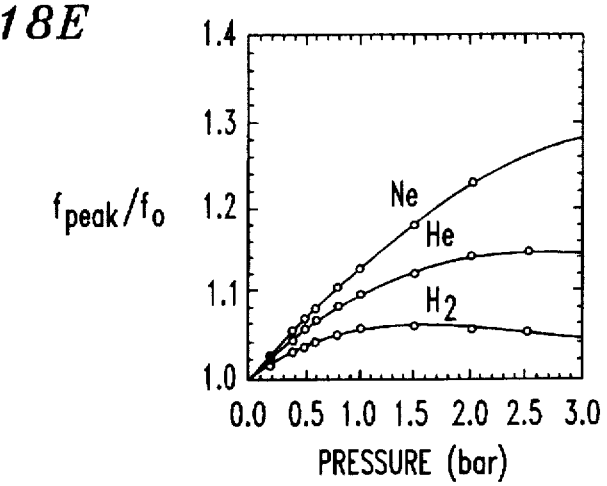
Figure 18F:
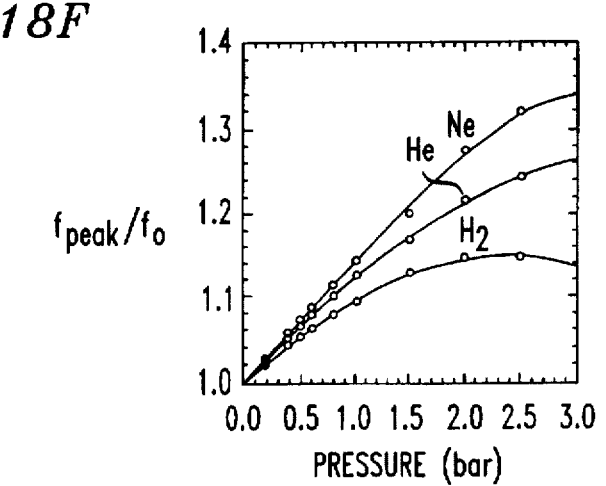
Figure 19A:
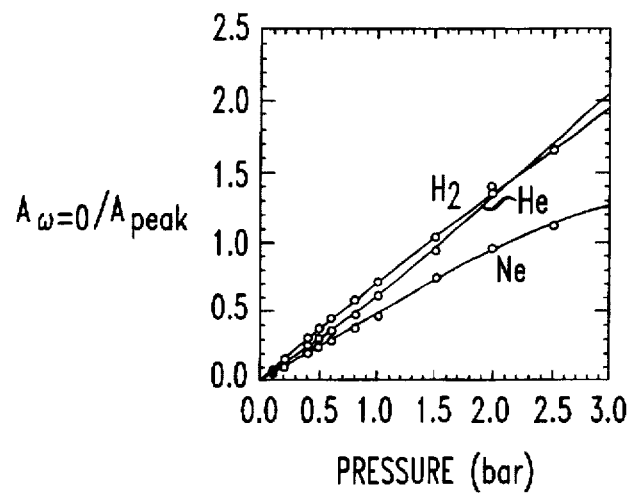
FIGS. 19a–f show measured peak amplitudes as a function of pressure for exemplary drumhead modulators nos. 1–6 in hydrogen, helium and neon atmospheres.
Figure 19B:
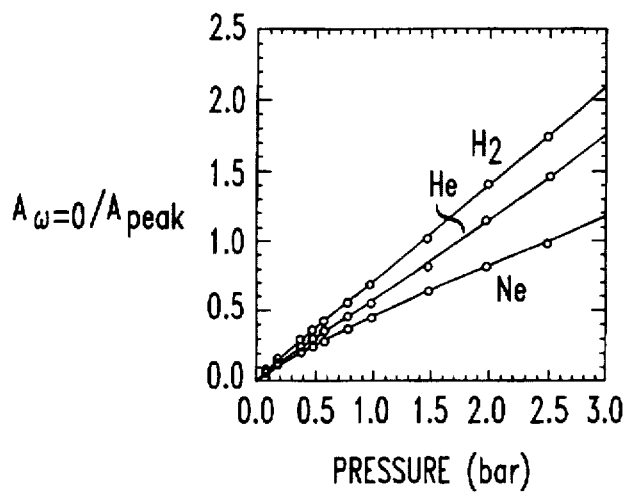
Figure 19C:
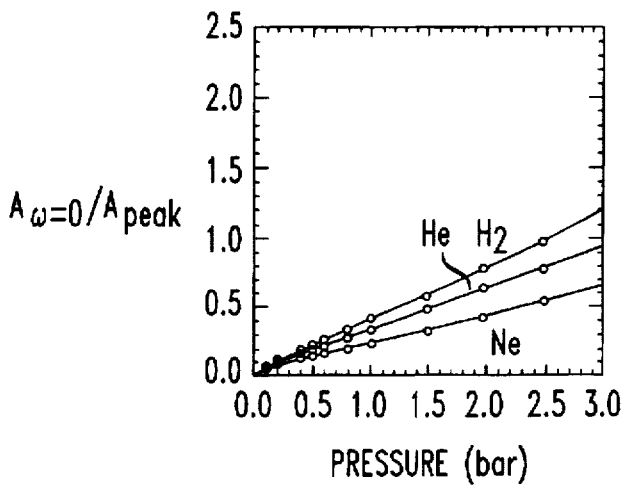
Figure 19D:
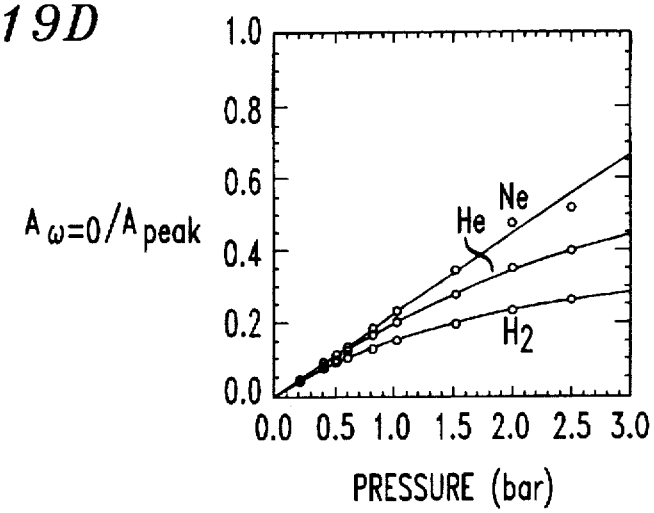
Figure 19E:
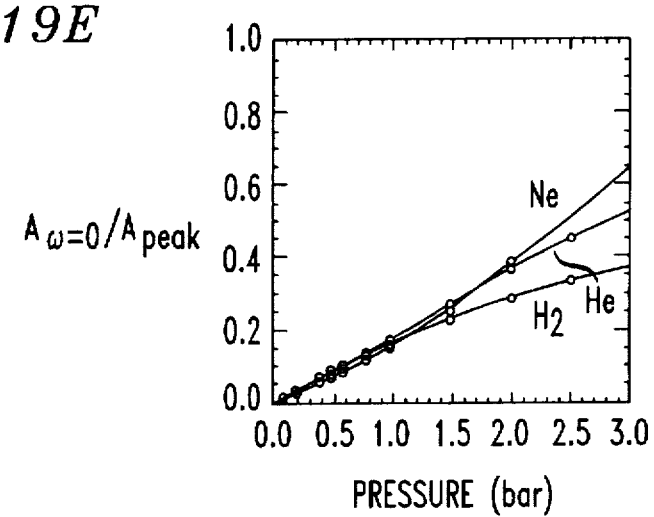
Figure 19F:
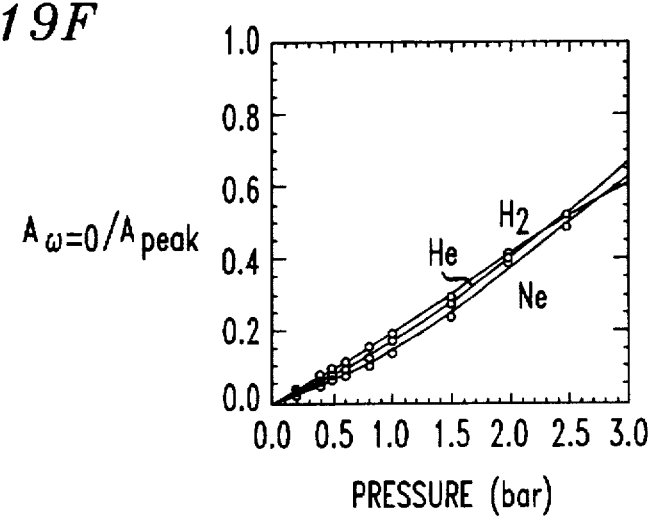

Examples of measured frequency response are shown in FIGS. 16 and 17, with the various curves in each plot corresponding to different helium pressures ranging from 0.2 to 3 bar. Each of the curves has been normalized so that at zero frequency the amplitude is unity. The small peak near 5 MHz in FIG. 16 is a higher-order mode not included in our simple model.

The measured response is obviously very different for these two samples: Sample 5 exhibits a rather standard set of resonance curves with the low frequency amplitude rising monotonically from unity. The peak frequency shifts by only 10% over the entire pressure range. In contrast to this behavior, Sample 2 shows a low frequency amplitude which drops well below unity at the higher pressures. And now, the peak frequency more than doubles with increasing pressure. Note that both of the samples have the hole arrangement shown in FIG. 15b and have nearly the same natural frequency, namely 2 MHz. They differ only in gap size.

Figure 20A:
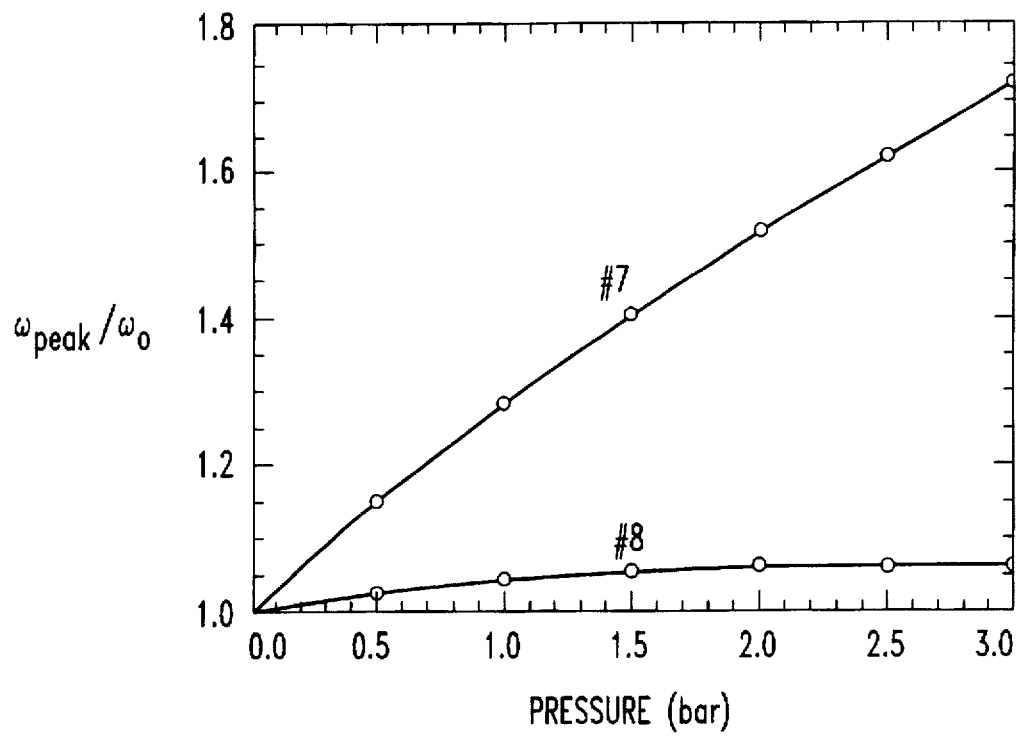
FIG. 20a shows measured peak frequency as as a function of pressure for exemplary drumhead modulator nos. 7 and 8 in helium.
Figure 20B:
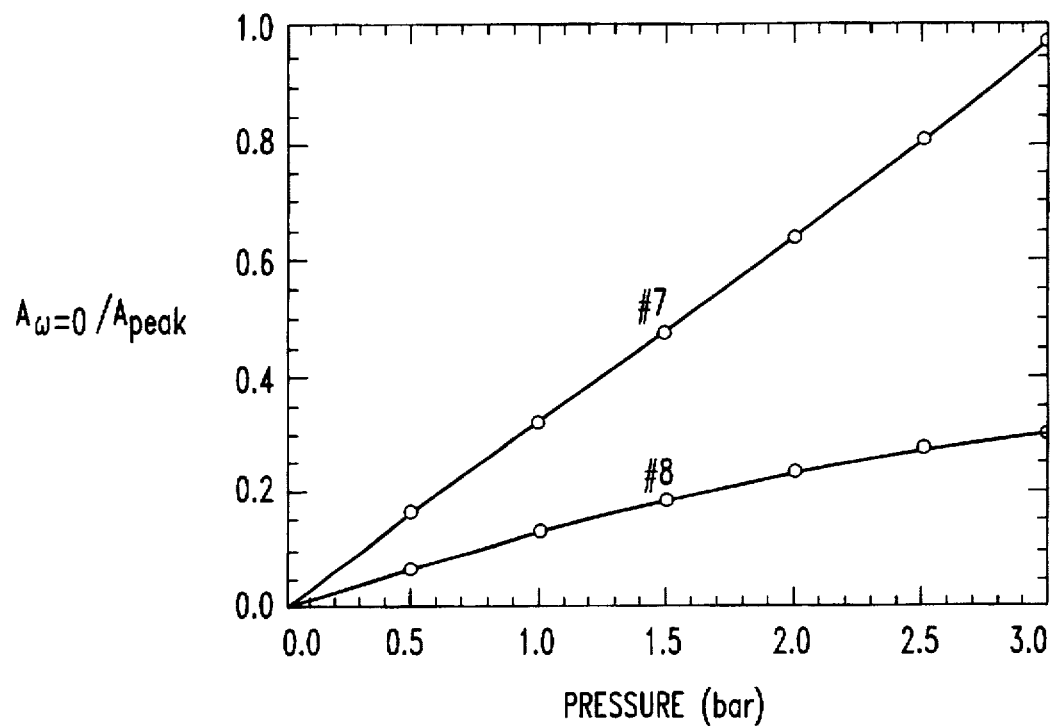
FIG. 20b shows measured peak amplitude as a function of pressure for exemplary drumhead modulator nos. 7 and 8 in helium.

The frequency and amplitude of the measured resonance peaks, extracted from plots similar to FIGS. 16 and 17, are plotted versus pressure in FIGS. 18a–f and 19a–f. These data are for devices 1–6, all of which have the same diameter (150 μm) and the same natural frequency $f_o$ (2 MHz). Samples 1–3 have the small gap spacing. Samples 4–5 have the larger gap. Note the different ordinate scales for each row of figures. The sample pairs 1 and 4, 2 and 5, and 3 and 6 have the same damping hole arrangements corresponding to FIG. 16a, b, and c, respectively. Frequency and amplitude data for Samples 7 and 8, with the smaller drumhead diameter are shown in FIGS. 20a and 20b, respectively, and now only for helium.

Using these complicated results as input corresponding values of $\omega_g/\omega_o$ and $1/\omega_o\tau$ were extracted according to the discussion in Sec. 8.0. As demonstrated later, these derived quantities behave quite simply and allow us to understand the experimental observations.

B. Anomalous Results for Ar and Xe

Compared to data obtained for the lighter gases, the frequency response curves for Ar and Xe often showed more complicated resonance behavior, making it difficult, and sometimes impossible, to extract meaningful information. In this section we attempt to explain these observations.

Figure 21:
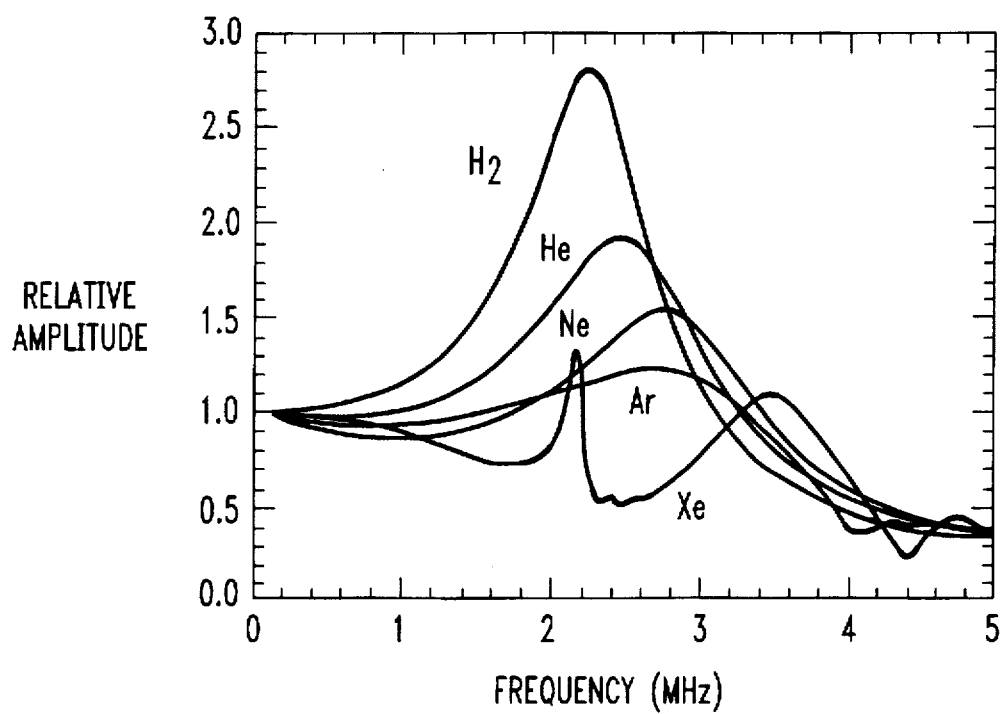
FIG. 21 shows measured resonance curves at 3 bar pressure for a variety of gases for exemplary drumhead modulator no. 5.

FIG. 21 shows response curves for Sample 5 obtained using various gases, all at a pressure of 3 bar. The curves for $H_2$, He, and Ne are smooth and show no unusual features. In contrast to this, the results for Ar show some structure near 4 MHz while the Xe curve actually exhibits a well-defined anomalous peak near 2 MHz. The frequency of this peak does not shift with drive amplitude or with pressure. Sample 2, which is identical to Sample 5 except for the smaller gap size, does not show a peak at 2 MHz, but instead a large interference signal near 3.6 MHz.

The fact that $f_{anom}$ is independent of pressure immediately suggests a sound resonance in the gas within the device. The fundamental plane-wave mode has a resonance frequency given by:

$$f_{pw}=v_{gas}/2t_{gap} \quad (58)$$

with $$v_{gas} = \sqrt{\gamma RT/M} \qquad (59)$$

for an ideal gas. Using $v_{Xe} \approx 180$ m/sec and $t_{gap} \approx 1$ μm implies $f_{pw} \approx 90$ MHz, which is more than an order of a magnitude too large.

Purely transverse vibrations, however, can have much lower frequencies. These resonances are determined by the relation $$f_{mn} = \frac{v_{gas}\alpha_{mn}}{D} \qquad (60)$$

where D is the diameter of the cylindrical chamber, $\alpha_{mn}$ is a solution of $d[J_m(\pi\alpha)]/d\alpha=0$, and $J_m(\pi\alpha)$ is a Bessel function of the first kind. Using D=150 μm and the sound velocity for Xe, Eq. 60 predicts possible resonances (in MHz) at $f_{01}=1.5$, $f_{02}=2.7$, $f_{03}=3.9$, $f_{11}=0.7$, $f_{12}=2.0$, and $f_{13}=3.2$, which are now of the proper magnitude. A direct comparison of numbers suggests that the anomaly near 2.2 MHz for Sample 5 may be the $f_{12}$ mode, while the peak for Sample 2 at 3.6 MHz may be the $f_{13}$ mode.

According to Eqs. 59 and 60 the transverse resonances in the gas are proportional to $M^{-1/2}$ and so are pushed to much higher frequencies for the lighter gases, explaining the absence of anomalies in these data.

Note that because the relatively high Q anomaly for the large-gap samples occurred near $f_o$ (presumably by accident) the low pressure Xe curves were ambiguous. On the other hand, the small gas samples, with the anomaly at a much higher frequency could be analyzed if the pressure was not too high. Figures in the later sections will therefore only include Ar and Xe results for Samples 1–3.

C. Results for $\omega_g/\omega_o$

FIG. 22 shows $\omega_g/\omega_o$ plotted versus $p^{1/2}$ for Samples 2 and 5. >From this plot we determine immediately that 1) $\omega_g/\omega_o$ is proportional to $p^{1/2}$, 2) $\omega_g/\omega_o$ is independent of gas type, and 3) $\omega_g/\omega_o$ generally varies inversely with the gap spacing. Each of these observations agrees with our expectations based on Eqs. 17 and 37. This self-consistency, which will be examined in the remainder of this section, supports the application of our model to this particular set of devices.

Although Samples 1–3 differ in the damping hole arrangement, the dimensions of the cylindrical cavity under the membrane are the same and so, from Eq. 17, the gas frequencies should be identical. Indeed, we find $f_g/P^{1/2}=2.6$ for each of these devices.

The corresponding parameters for the larger gap Samples 4–6 should also be the same. But here we find a greater variation, with the value for Sample 4 being 15 % larger than the values for Samples 5 and 6. The discrepancy is correlated with $f_g$ also showing a weak dependence on gas type, at least for pressures below 1 bar. Note though, that the uncertainties in the extracted model parameters for the large-gap samples will be larger because the measured frequency shifts are very small. See FIG. 18. Weighting the results for Samples 5 and 6 more heavily we conclude that the value for these devices is $f_g/P^{1/2}=1.3$.

FIG. 23 shows $\omega_g/\omega_o$ data for Samples 7 and 8 which were obtained only using helium. Recall that these devices are smaller in diameter and have a much higher natural frequency $f_o$. Again, however, we extract about the same values, namely $f_g/P^{1/2}=2.7$ for the small gap sample, and 1.3 for Sample 8, and demonstrate explicitly that this parameter does not depend on device diameter.

A direct evaluation of Eq. 37 yields $f_g/P^{1/2}=2.4$ MHz/bar$^{1/2}$ for the small gap samples (h=0.39 μm, t=0.19 μm, and $\bar{\rho}=5.9$ gm/cm$^3$) and 1.4 MHz/bar$^{1/2}$ for the large gap devices (h=0.97 μm, t=0.23 μm, and $\bar{\rho}=5.9$ gm/cm$^3$). Given the uncertainties in the input parameters, the 10% agreement with the measurements is acceptable.

D. Results for τ

In this section we analyze the $1/\omega_o\tau$ values extracted from the measurements and find empirical relations to describe these results. These expressions are surprisingly simple and help to give the model predictive power.

FIGS. 24a–f shows $1/\omega_o\tau$ for Samples 1–6, respectively; FIG. 25 shows data for Samples 7 and 8. Note that these curves are qualitatively much simpler than the measured input data shown in FIGS. 18 and 19. Consistency with the functional form of Eq. 43 is demonstrated in FIG. 26 where $(1/\omega_o\tau)^2$ is plotted versus $P^2$. The intercepts and slopes of the three straight lines drawn in the figure determine $(\alpha/\omega_o)^2$ and $(\beta/\omega_o)^2$ for each of the corresponding gases.

The deviations from the straight lines at low pressures are systematic and are shown in greater detail in FIG. 27. These particular data are for Sample 1 in $H_2$ but are representative of the results for other samples and other gases. The dip in the curve is presumably the Knudsen minimum seen in ordinary gas flow measurements when the mean free path of the gas molecules is comparable to the dimensions of the tube. Because this behavior is confined to low gas pressures it will not be significant for our further analysis.

As already discussed in Sec. 7.0 we expect both α and β to be functions of the various physical dimensions of the device. In addition α should depend on the molecular mass and β on the gas viscosity. Fitting the α and β values for each sample to various simple power-law expressions it was determined that $$\alpha = \alpha_o/M^{\frac{1}{4}} \qquad (61)$$

and $$\beta = \beta_o/\eta^{\frac{1}{2}} \qquad (62)$$

represent the data well. The parameters $\alpha_o$ and $\beta_o$ are dependent on device geometry and so are different for each sample.

To reduce the uncertainties in the best-fit parameters due to correlations, the $1/\omega_o\tau$ data were refit using the expression $$\frac{1}{\omega_o\tau} = \left[\left(\frac{\alpha}{\omega_o}\right)^2 + \left(\frac{\beta_o}{\omega_o\eta^{1/2}}\right)^2 P^2\right]^{1/2} \qquad (63)$$

So for each device we now determine $\beta_o$ and a value of α for each gas tested.

FIG. 28 shows these best-fit values of α plotted versus $$M^{-\frac{1}{4}}$$

to demonstrate the simple proportionality between these two quantities. The only significant deviations from the straight lines in this figure occur for hydrogen and the large-gap samples. In the following we ignore the difficulties with the hydrogen results and concentrate on the monatomic rare gas data. The slope of each straight line in FIG. 28 determines $\alpha_o/\omega_o$ for each device.

FIGS. 29a and b show $\alpha_o/\omega_o$ and $\beta_o/\omega_o$ plotted versus N·d. It is rather surprising but certainly convenient, that these data again fall on lines passing through the origin. So to a good approximation, these parameters are simply proportional to the total circumference of all of the damping holes in the membrane. Moreover, we find that the ratio of the slopes of the two lines in FIG. 29a is 2.4. For FIG. 29b the ratio is again 2.4. This number is within the experimental uncertainties equal to the ratio of the gap spacings, namely 0.97/0.39=2.5.

Bringing these observations together and using an average value for $\omega_o$, namely $2\pi \cdot 2.15$ MHz, we have $$\alpha = 1.89 \times 10^5 Ndh/M^{\frac{1}{4}} \qquad (64)$$

and $$\beta = 2.77 \times 10^5 Ndh/\eta^{1/2}. \qquad (65)$$

Thus, for Samples 1–6 we can write $$\frac{1}{\tau} = 1.89 \times 10^5 \frac{Ndh}{M^{\frac{1}{4}}} \left[ 1 + \frac{2.1 M^{1/2} P^2}{\eta} \right]^{1/2}. \qquad (66)$$

Note, comparing Eqs. 9 and 66 shows that the effective "porosity" $\xi$ goes as $h^2$.

According to Eq. 9, $1/\tau$ should be inversely proportional to the area of the device or to $D^2$. The explicit dependence on $D^2$ can be introduced into Eq. 66 by multiplying the right hand side by $(150 \,\mu m/D)^2$, which for Samples 1–6 is unity. We thus obtain the general relation $$\frac{1}{\tau} = 4.3 \times 10^9 \frac{Ndh}{D^2 M^{\frac{1}{4}}} \left[ 1 + \frac{2.1 M^{1/2}}{\eta} P^2 \right]^{1/2}. \qquad (67)$$

Again, N is the number of damping holes of diameter d, which are distributed "uniformly" over the membrane, D is the device diameter, h is the gap spacing, $\eta$ is the viscosity in units of $10^{-5}$ poise, and P is the pressure in bar.

The $1/\omega_o\tau$ data for Samples 7 and 8 were not used in extracting Eq. 67 and can be used to check this expression. These devices have D=120 μm, d=5 μm, and N=24. Sample 7 has h=0.39 μm and $f_o$=2.94 MHz; Sample 8 has h=0.97 and $f_o$=2.67 MHz. Substituting these numbers into Eq. 67 we obtain $$\frac{1}{\omega_o \tau}\bigg|_{\#7,He} = 0.53 (1 + 0.21 P^2)^{1/2} \qquad (68)$$

and $$\frac{1}{\omega_o \tau}\bigg|_{\#8,He} = 1.45 (1 + 0.21 P^2)^{1/2} \qquad (69)$$

These equations describe the experimental data well and were used to plot the solid curves shown in FIG. 25.

A further test of the model was made by computing resonance curves using Eq. 22 with $\omega_s/\omega_o$ given by Eq. 37 and $1/\omega_o\tau$ given by Eq. 67. FIGS. 30 and 31 show curves based on the physical parameters describing Samples 2 and 5 respectively. These figures can be compared directly with the experimental curves in FIGS. 17 and 18. The largest differences occur near zero frequency for Sample 2. This sample has a small gap and a small value of $1/\omega_o\tau$.

E. Square-Wave Response

Measured and calculated square-wave response curves are compared in FIGS. 32a–d, which shows results for Sample 1 in $H_2$, and in FIGS. 33a–d which shows results for Sample 5 in He. Pressure increases going from FIGS. 32a and 33a at 0.5 bar, to 1.0, 2.0 and 3.0 bar for FIGS. 32b and 33b, FIGS. 32c and 33c, and FIGS. 32d and 33d, respectively. The calculated curves are based on the empirical expressions for $\omega_s/\omega_o$ and $1/\omega_o\tau$, i.e. Eqs. 37 and 67, and were computed according to the discussion of Sec. 9.0. The large noise amplitude in the experimental curves for Sample 5 is explained by the fact that the membrane thickness and the gap size were not properly paired to give a strong optical signal. Nonetheless, detailed agreement between measured and calculated response is apparent in both figures.

Note that although the ringing for Sample 1 is completely suppressed by a gas pressure above 2 bar, the price for this is a slow rise time. Ringing for Sample 5 (with the larger gap size) is more severe and persists to the highest test pressure. The two samples therefore deviate in behavior to opposite sides of optimum response.

F. Devices with Optimum Response

FIG. 14 of Sec. 10.0 showed the range of $\omega_s/\omega_o$ and $1/\omega_o\tau$ values leading to optimum square-wave response. We now want 1) to locate where our present samples lie in this plot, 2) to map out the path followed as the ambient pressure is changed, and 3) to determine how these devices might be modified to improve performance.

According to Eqs. 17 and 43 we can write $$\omega_s = \gamma P^{1/2} \qquad (70)$$

and $$1/\tau = [\alpha^2 + \beta^2 P^2]^{1/2} \qquad (71)$$

where $\alpha$, $\beta$, and $\gamma$ are parameters which do not depend on pressure or frequency. Eliminating pressure from these expressions then leads, in terms of dimensionless quantities, to $$\frac{1}{\omega_o} \tau = \left[ \left( \frac{\alpha}{\omega_o} \right)^2 + \frac{(\beta/\omega_o)^2}{(\gamma/\omega_o)^4} \left( \frac{\omega_s}{\omega_o} \right)^4 \right]^{1/2} \qquad (72)$$

The solid curves in FIG. 34 show Eq. 72 evaluated using the parameters appropriate for Samples 1 and 6 in argon gas. The region for optimum response is also indicated; see Sec. 10.0. Note that Sample 1 is the small-gap sample with the largest porosity, and that Sample 6 is the large-gap sample with the smallest porosity. So none of our samples has optimum response.

The dotted curve shows the $1/\omega_o\tau$ values for Sample 1 scaled by 2.94. According to Eq. 67, this curve should correspond, for example, to a device identical to Sample 1 except for an increase in the number of 5 μm holes from 36 to 2.94×36=106. Similarly, the dashed curve which shows the scaling of the Sample 6 curve by a factor of 0.6, would indicate the behavior of a device identical to Sample 6 but with 14, 3 μm holes instead of 24. It is encouraging that both scaled curves generally run parallel to the optimized region, implying that a clean square wave response can be achieved for a sizable range of gas pressures. Of course, the actual magnitudes of the gas pressure for these two devices would be quite different. As a caution, it should be noted that 106 holes for the small-gap device corresponds to a density of holes much greater than actually studied and that at this density Eq. 67 may underestimate the number of holes.

The pressure can be determined using Eq. 20, which can be rewritten as $$P = \left[ \frac{\omega_s}{\omega_o} / \frac{\gamma}{\omega_o} \right]^2. \qquad (73)$$

In Sec. 11.0C above, we determined that $f_s/P^{1/2}$ was 2.6 MHz/bar$^{-1/2}$ for the small-gap samples and 1.3 for the large-gap samples. Because $f_o$=2 MHz we have $\gamma/\omega_o$ equal to 2.6/2 and 1.3/2, respectively. Using these numbers, and choosing to operate in the optimized region at $\omega_s/\omega_o$=2, we compute corresponding pressures of 2.7 bar and 13.7 bar.

FIG. 35 shows a calculated set of response curves for the small-gap device with the optimized damping. Comparing these curves with those in FIG. 30, note 1) that the response at very low frequencies no longer falls rapidly below unity, 2) that the frequency shifts are now much smaller, and 3) that the response curve near 3 bar no longer shows any remnant of a resonance peak. The corresponding evolution in square-wave response is shown in FIGS. 36a–e, which can be compared with FIG. 32. Pressure increases from 0.5 bar in FIG. 36a, to 1.0, 1.5, 2.0 and 3.0 bar in FIGS. 36b–e, respectively.

The evolution of square-wave response for the large-gap sample with 14, 3 µm diameter damping holes is shown in FIG. 37. Pressure increases from 1 bar om FIG. 37a, to 2,4,8 and 12 bar in FIGS. 37b–e, respectively. Note, again the large pressure required to obtain a clean square-wave signal.

12.0 Modeling: An Example

We ask, as an example, what is the fastest device we can make with a gap of 0.97 µm if we are limited by a maximum gas pressure of 2 bar? Assume first that the device diameter is kept at 150 µm.

Because the physical geometry is unchanged, we still have $$f_g = 1.3 P^{1/2} \tag{74}$$

and so at 2 bar pressure, $f_g = 1.87$ MHz. If we insist that $\omega_g/\omega_o \approx 2$, then $f_o$ must be 0.93 MHz, corresponding to a maximum data rate of about 3 Mbits/sec.

For a drumhead device, we have $$f_o \sim \frac{1}{D}\sqrt{\frac{S}{\rho}} \tag{75}$$

The natural frequency (with D fixed) therefore, can be decreased by a factor of two by decreasing the membrane stress by a factor of four. Our present devices had a stress of about 800 MPa, so this would have to be reduced to roughly 200 MPa. One might also increase the average membrane density by increasing the thickness of the gold electrode.

Having chosen $\omega_g/\omega_o$ to be 2, means from FIG. 14, that $1/\omega_o\tau$ must be about 3. Using h=0.97 µm, D=150, $\omega_o = 0.93 \times 10^6 \cdot 2\pi$, P=2 bar, and the mass and viscosity for argon, Eq. 67 yields $$1/\omega_o\tau = 0.023\, Nd \tag{76}$$

which we set equal to 3 to obtain $$Nd = 130\ \mu m \tag{77}$$

If we choose to fix d at 5 µm, then N=26; if we fix N at 12, d=11 µm.

In the above sample calculation, D was fixed at 150 µm and S was altered to change the natural frequency. We now repeat the calculation with S fixed and allow D to vary.

Since $f_g$ is independent of D, it continues to be given by Eq. 74, and so $f_o$ remains at 0.93 MHz. The natural frequency is now reduced to this value by increasing the drumhead diameter. Using Eq. 75, the diameter must be enlarged by the factor 2 MHz/0.93 MHz. The new diameter is then 322 µm. Eq. 67 now gives at P=2 bar $$1/\omega_o\tau = 0.0049\, Nd \tag{78}$$

which we again set equal to 3 to find $$Nd = 610. \tag{79}$$

We now require 122, 5 µm holes. Note that the density of 5 µm holes, $N/D^2$, is the same for both examples.

12.0 Summary

A simple phenomenological model was proposed to explain the gas damping of squeeze-type micromachined devices. The physical model consists of a piston supported by a spring and located in a cylinder which is closed except for a number of small holes. These holes allow gas to enter or escape from the cylinder in response to the piston's displacement. With the assumption that the rate of gas flow is proportional to the pressure difference across the piston, the equations of motions were solved exactly in terms of two reduced quantities $\omega_g/\omega_o$ and $1/\omega_o\tau$. The main contribution to the damping was found to be due to the out-of-phase component of the cylinder pressure.

The region for optimum square-wave response was mapped out in the $\omega_g/\omega_o - 1/\omega_o\tau$ plane and shown not to extend to the origin. One implication is that a minimum pressure must be exceeded to achieve critical damping. This pressure is greater than atmospheric pressure for devices designed to operate above a few MHz, and rises quadratically with increasing frequency. Changing the pressure alone, however, can not bring about optimum response, unless the effective piston porosity also has the proper magnitude.

By varying the values of the two model parameters, frequency and square-wave response curves were generated which exhibited the unusual features seen in some of the experimental data. In particular, frequency-response curves were obtained which showed a very rapid drop in frequency response near zero frequency, and square-wave response curves were obtained which clearly showed the effects of two very-different time constants.

Treating the two parameters as quantities to be determined empirically, the model was applied to a set of micromachined samples. Each of these devices was in the form of a cylindrical drum with a perforated drumhead membrane. They differed by the number and size of holes in the membrane and also by the gap spacing between the membrane and substrate. Measurements were made using various gases and at several different gas pressures. Fits to each of the measured response curves were made to extract values of $\omega_g/\omega_o$ and $1/\omega_o\tau$.

The $\omega_g/\omega_o$ results were found to be independent of gas type and membrane porosity and in agreement with the expression derived for the piston model, namely $$\frac{\omega_g}{\omega_o} = \frac{P^{1/2}}{\omega_o \sqrt{h\rho}} . \tag{80}$$

This agreement was interpreted as direct evidence for the applicability of the model to these particular structures.

The $1/\omega_o\tau$ were found to be well described by the simple purely-empirical relation $$\frac{1}{\omega_o\tau} = 4.3 \times 10^9 \frac{Ndh}{\omega_o D^2 M^{\frac{1}{4}}} \left[1 + \frac{2.1 M^{1/2}}{\eta} P^2\right]^{1/2} . \tag{81}$$

Eqs. 80 and 81 were used to predict the damping hole arrangement for a drumhead device square-wave response.

TABLE I

| | Gas Parameters | |
|---|---|---|
| Gas | Molecular Weight, M | Viscosity ($10^{-5}$ Poise) |
| $H_2$ | 2.02 | 9.0 |
| He | 4.00 | 20.0 |
| Ne | 20.18 | 32.1 |

TABLE I-continued

Gas Parameters

| Gas | Molecular Weight, M | Viscosity ($10^{-5}$ Poise) |
|---|---|---|
| Ar | 39.94 | 22.9 |
| Kr | 83.80 | 25.6 |
| Xe | 131.30 | 23.2 |

TABLE II

Parameters for the drumhead text devices

| Sample Number | D (μm) | h (μm) | N | d (μm) | $f_o$ (MHz) | $f_g/\sqrt{P}$ (MHz/bar$^{1/2}$) |
|---|---|---|---|---|---|---|
| 1 | 150 | 0.39 | 36 | 5 | 2.14 | 2.6 |
| 2 | 150 | 0.39 | 24 | 5 | 2.02 | 2.6 |
| 3 | 150 | 0.39 | 24 | 3 | 2.06 | 2.6 |
| 4 | 150 | 0.97 | 36 | 5 | 2.19 | 1.5 |
| 5 | 150 | 0.97 | 24 | 5 | 2.15 | 1.3 |
| 6 | 150 | 0.97 | 24 | 3 | 2.26 | 1.4 |
| 7 | 120 | 0.39 | 24 | 5 | 2.94 | 2.6 |
| 8 | 120 | 0.97 | 24 | 5 | 2.67 | 1.3 |

I claim:

1. A high-speed gas-damped micromechanical structure comprising:

a movable member;

a gas-tight seal enclosing the movable member; and a gas within the gas-tight seal, wherein, ambient pressure within the gas-tight seal is greater than about one atmosphere and no more than about 48 atmospheres.

2. The structure of claim 1, wherein the movable member is characterized by a first side and a second side, and further comprising:

a cavity located on the second side of the movable member, a plurality of holes for allowing gas to escape from the cavity.

3. The structure of claim 2 wherein the plurality of holes are located in the movable member.

4. A high-speed gas-damped micromechanical structure comprising:

a movable member having a plurality of holes for allowing the passage of gas from a first side of the member to a second side of the member during oscillatory motion of the member; wherein, ambient pressure of the member is less than about 48 atmospheres, and further wherein $1/(\omega_o \tau)$ is at least about 1.4 and $\omega_g/\omega_o$ is at least about 1.3, where, $1/(\omega_o\tau)$ is a measure of porosity of the movable member;

$\omega_g/\omega_o$ is reduced gas frequency; and $\omega_o$ is resonant frequency of the member in a vacuum.

5. The structure of claim 4 and further wherein:

$$0.25+0.7(\omega_g/\omega_o)^2-0.8(\omega_g/\omega_o-1.25) \leq 1/(\omega_o\tau) \leq 0.25+0.7(\omega_g/\omega_o)^2+(\omega_g/\omega_o-1.25).$$

6. A micromechanical optical modulator comprising:

a movable layer suspended above a non-moving layer, the two layers forming a modulator cavity therebetween;

a gas-tight seal formed over the movable layer; and a gas, wherein, when the movable layer moves toward the non-moving layer in response to a signal, a portion of the gas flows out of the modulator cavity providing damping to the movable layer, and further wherein the ambient pressure due to the gas is greater than about one atmosphere and no more than about 48 atmospheres.

7. The micromechanical optical modulator of claim 6 further comprising a plurality of damping holes for allowing the gas to flow out of the modulator cavity.

8. The micromechanical optical modulator of claim 7 wherein the plurality of damping holes is formed in the movable layer.

9. The micromechanical optical modulator of claim 8 wherein, when the movable layer moves toward the non-moving layer, the gas flows from the modulator cavity through the plurality of holes to a region above the movable layer.

10. The micromechanical optical modulator of claim 8 wherein the movable layer has a porsity, $1/(\omega_o\tau)$, of at least about 1.4, and a reduced gas frequency, expressed as $\omega_g/\omega_o$, of greater than about 1.3, wherein $\omega_o$ is resonant frequency of the member in a vacuum.

11. The micromechanical optical modulator of claim 10 wherein $$0.25+0.7(\omega_g/\omega_o)^2-0.8(\omega_g/\omega_o-1.25) \leq 1/(\omega_o\tau) \leq 0.25+0.7(\omega_g/\omega_o)^2+(\omega_g/\omega_o-1.25).$$

12. The micromechanical optical modulator of claim 6 wherein nonmovable layer is characterized by a first refractive index and the movable layer is characterized by a second refractive index and wherein the second refractive index is about equal to the square root of the first refractive index.

13. The micromechanical optical modulator of claim 10 wherein $\omega_g/\omega_o$ is about 2.0 and $2.7 \leq 1/(\omega_o\tau) \leq 3.8$.

14. The micromechanical optical modulator of claim 6 wherein the gas is selected from the group consisting of hydrogen and noble gases.

15. The micromechanical optical modulator of claim 6 wherein the distance between the movable layer and the non-moving layer is equal to about one quarter of a wavelength of an optical signal when the movable layer is in an equilibrium position, and the ambient gas pressure is at least 2 bar.

16. The micromechanical optical modulator of claim 4 wherein the distance between the movable layer and the non-moving layer is in the range of 0.6 to 0.75 times a wavelength of an optical signal when the movable layer is in an equilibrium position, and the ambient gas pressure is at least 8 bar.

17. A high-speed gas-damped micromechanical structure comprising:

a movable member;

a gas-tight seal enclosing the movable member; and a gas within the gas-tight seal, wherein, $$0.25+0.7(\omega_g/\omega_o)^2-0.8(\omega_g/\omega_o-1.25) \leq 1/(\omega_o\tau) \leq 0.25+0.7(\omega_g/\omega_o)^2+(\omega_g/\omega_o-1.25).$$

$1/(\omega_o\tau)$ is a measure of porosity of the movable member;

$\omega_g/\omega_o$ is reduced gas frequency; and $\omega_o$ is resonant frequency of the member in a vacuum.

18. The structure of claim 17, wherein the movable member is a movable layer that is suspended above a non-moving layer, the two layers forming a modulator cavity therebetween.

* * * * *